US012594499B2

(12) United States Patent
Cai

(10) Patent No.: US 12,594,499 B2
(45) Date of Patent:         Apr. 7, 2026

(54) AUXILIARY VIRTUAL OBJECT CONTROL IN VIRTUAL SCENE

(71) Applicant: Tencent Technology (Shenzhen) Company Limited, Shenzhen (CN)

(72) Inventor: Fenlin Cai, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 448 days.

(21) Appl. No.: 18/140,467

(22) Filed: Apr. 27, 2023

(65) Prior Publication Data

US 2023/0256341 A1     Aug. 17, 2023

Related U.S. Application Data

(63) Continuation of application No. PCT/CN2022/091115, filed on May 6, 2022.

(30) Foreign Application Priority Data

May 31, 2021    (CN) .......................... 202110605036.2

(51) Int. Cl.
A63F 13/58          (2014.01)
A63F 13/426        (2014.01)
                    (Continued)

(52) U.S. Cl.
CPC ............ A63F 13/58 (2014.09); A63F 13/426 (2014.09); G06T 19/20 (2013.01); G06V 10/761 (2022.01);
                    (Continued)

(58) Field of Classification Search
CPC ........ A63F 13/58; A63F 13/426; A63F 13/52; A63F 13/533; A63F 13/69; A63F 13/55; A63F 13/837
See application file for complete search history.

(56) References Cited

U.S. PATENT DOCUMENTS 8,210,943 B1 *   7/2012   Woodard ................ A63F 13/69
                                                    463/2
2002/0034979 A1 *   3/2002   Yamamoto .............. A63F 13/56
                                                    463/31
                    (Continued)

FOREIGN PATENT DOCUMENTS

CN          111589131 A       8/2020
CN          111686449 A       9/2020
                    (Continued)

OTHER PUBLICATIONS

"A comprehensive explanation of League of Legends' Dark Daughter Annie", Catastrophe X, 2017, 5 pages.
                    (Continued)

*Primary Examiner* — James S. McClellan
(74) *Attorney, Agent, or Firm* — ARENTFOX SCHIFF LLP

(57)                    ABSTRACT
In a method for controlling an auxiliary virtual object in a virtual scene, a first virtual object is controlled to select a lock target in the virtual scene for the auxiliary virtual object. A lock command for the selected lock target is received. The auxiliary virtual object is controlled to enter a first assist state based on the lock command when the lock target is a second virtual object in the virtual scene. The auxiliary virtual object is configured to automatically perform at least one action on the second virtual object in the first assist state.

20 Claims, 15 Drawing Sheets

(51) Int. Cl.
G06T 19/20 (2011.01)
G06V 10/74 (2022.01)

(52) U.S. Cl.
CPC ................. *G06T 2219/2004* (2013.01); *G06T 2219/2016* (2013.01)

(56) References Cited

U.S. PATENT DOCUMENTS

| | | | |
|---|---|---|---|
| 2006/0084509 A1* | 4/2006 | Novak | A63F 13/30 |
| | | | 463/30 |
| 2013/0196767 A1* | 8/2013 | Garvin | A63F 13/422 |
| | | | 463/36 |
| 2021/0268377 A1* | 9/2021 | Hamaguchi | A63F 13/5252 |

FOREIGN PATENT DOCUMENTS

| | | |
|---|---|---|
| CN | 112295230 A | 2/2021 |
| CN | 113181650 A | 7/2021 |
| JP | 2010-136744 A | 6/2010 |
| JP | 2019-136358 A | 8/2019 |
| WO | 2020/239056 A1 | 12/2020 |

OTHER PUBLICATIONS

International Search Report and Written Opinion received for PCT Patent Application No. PCT/CN2022/091115, mailed on Aug. 5, 2022, with English Translation, 15 pages.

Office Action received for Chinese Patent Application No. 202110605036.2, mailed on Oct. 25, 2022, 15 pages (7 pages of English Translation and 8 pages of Original Document).

""LoL Wild Rift" Target Lock Tips", GameWith, Dec. 8, 2020, Available online at: <https://gamewith.jp/wildrift/ article/show/ 238503>, accessed on Jul. 17, 2024., (9 Pages Total).

Office Action received for Japanese Patent Application No. 2023-554780, mailed on Sep. 17, 2024, 15 pages (9 pages of English Translation and 6 pages of Original Document).

* cited by examiner

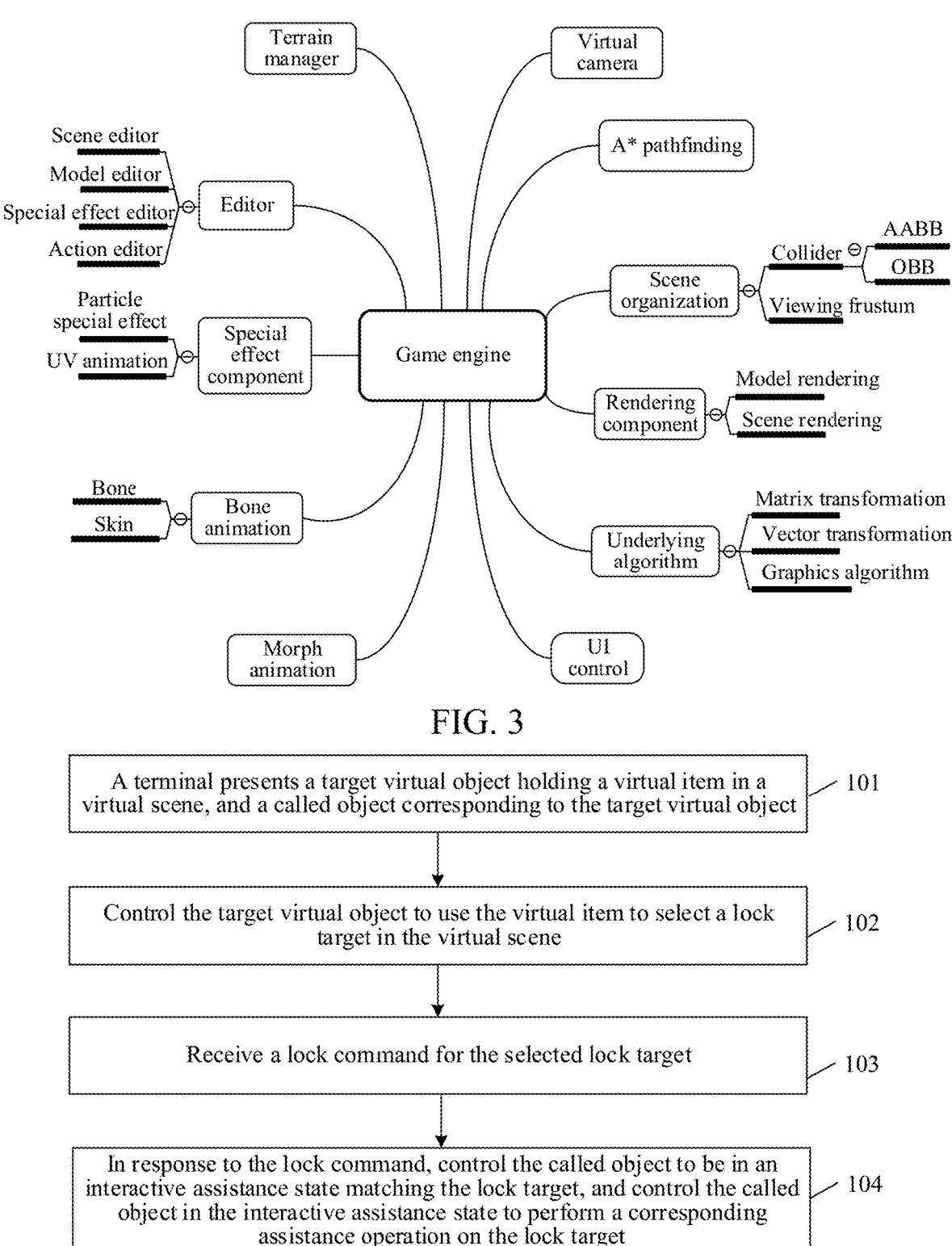

FIG. 3

| A terminal presents a target virtual object holding a virtual item in a virtual scene, and a called object corresponding to the target virtual object | 101 |

| Control the target virtual object to use the virtual item to select a lock target in the virtual scene | 102 |

| Receive a lock command for the selected lock target | 103 |

| In response to the lock command, control the called object to be in an interactive assistance state matching the lock target, and control the called object in the interactive assistance state to perform a corresponding assistance operation on the lock target | 104 |

FIG. 4

AUXILIARY VIRTUAL OBJECT CONTROL IN VIRTUAL SCENE

RELATED APPLICATIONS

This application is a continuation of International Application No. PCT/CN2022/091115, filed on May 6, 2022, which claims priority to Chinese Patent Application No. 202110605036.2, filed on May 31, 2021. The entire disclosures of the prior applications are hereby incorporated by reference in their entirety.

FIELD OF THE TECHNOLOGY

This application relates to the field of human-computer interaction technologies, including controlling a called object in a virtual scene, an electronic device, a computer-readable storage medium, and a computer program product.

BACKGROUND OF THE DISCLOSURE

With development of computer technologies, an electronic device may implement more abundant and vivid virtual scenes. A virtual scene includes a digital scene constructed by a computer by using a digital communication technology. In the virtual scene, a user may obtain a virtual feeling (for example, virtual reality) or a partially virtual feeling (for example, augmented reality) in aspects such as sight and hearing, and may also interact with various objects in the virtual scene, or control interaction between various objects in the virtual scene to obtain feedback.

In the related art, a user can control interaction between a single virtual object and another object, that is, control movement, a direction, a skill, and the like of only a single virtual object. However, controlling only a single virtual object for interaction not only limits an interaction skill, an interactive operation behavior, and the like that can be triggered, but also leads to a waste of hardware processing resources.

SUMMARY

Embodiments of this disclosure include a method and an apparatus for controlling a called object in a virtual scene, an electronic device, a computer-readable storage medium, and a computer program product, to control a plurality of objects to interact with other object in a virtual scene with simple operations, thereby improving efficiency of human-computer interaction and also improving utilization of hardware processing resources.

Technical solutions in embodiments of this disclosure may be implemented as follows:

An embodiment of this disclosure provides a method for controlling an auxiliary virtual object in a virtual scene. In the method, a first virtual object is controlled to select a lock target in the virtual scene for the auxiliary virtual object. A lock command for the selected lock target is received. The auxiliary virtual object is controlled to enter a first assist state based on the lock command when the lock target is a second virtual object in the virtual scene. The auxiliary virtual object is configured to automatically perform at least one action on the second virtual object in the first assist state.

An embodiment of this disclosure further provides an apparatus including processing circuitry. The processing circuitry is configured to control a first virtual object to select a lock target in a virtual scene for an auxiliary virtual object, and receive a lock command for the selected lock target. The processing circuitry is further configured to control the auxiliary virtual object to enter a first assist state based on the lock command when the lock target is a second virtual object in the virtual scene. The auxiliary virtual object is configured to automatically perform at least one action on the second virtual object in the first assist state.

An embodiment of this disclosure further provides an electronic device, including a memory and a processor. The memory is configured to store computer-executable instructions. The processor is configured to implement the method for controlling an auxiliary virtual object in a virtual scene in the embodiments of this disclosure during execution of the computer-executable instructions stored in the memory.

An embodiment of this disclosure further provides a non-transitory computer-readable storage medium storing instructions which when executed by a processor cause the processor to perform the method for controlling an auxiliary virtual object in a virtual scene in the embodiments of this disclosure.

An embodiment of this disclosure further provides a computer program product, including a computer program or computer-executable instructions, when being executed by a processor, the computer program or the computer-executable instructions implementing the method for controlling an auxiliary virtual object in a virtual scene in the embodiments of this disclosure.

Embodiments of this disclosure may include the following beneficial effects:

In an example, by using a method and an apparatus for controlling a called object in a virtual scene, the electronic device, the computer-readable storage medium, and the computer program product in the embodiments of this disclosure, a target virtual object holding a virtual item in a virtual scene, and a called object corresponding to the target virtual object are presented; the target virtual object is controlled to use the virtual item to select a lock target in the virtual scene; and when a lock command for the selected lock target is received, the called object is controlled to be in an interactive assistance state matching the lock target, and the called object in the interactive assistance state is controlled to perform a corresponding assistance operation on the lock target, thereby achieving an effect of automatically controlling the called object to assist, by executing the assistance operation, the target virtual object in interacting with another virtual object.

In this way, a plurality of objects (including the target virtual object and the called object) can be controlled to interact with other objects in the virtual scene. In addition, the called object can be controlled to be in the interactive assistance state matching the lock target only by selecting the lock target and triggering the lock command for the lock target, to automatically control the called object to perform the corresponding assistance operation to assist the target virtual object in interacting with another virtual object with simple operations, thereby improving efficiency of human-computer interaction and also improving utilization of hardware processing resources.

BRIEF DESCRIPTION OF THE DRAWINGS

FIG. 3 is a schematic diagram of a principle of a human-computer interaction engine installed on an apparatus for controlling a called object in a virtual scene according to an embodiment of this disclosure.

FIG. 4 is a schematic flowchart of a method for controlling a called object in a virtual scene according to an embodiment of this disclosure.

DESCRIPTION OF EMBODIMENTS

Figure 1:
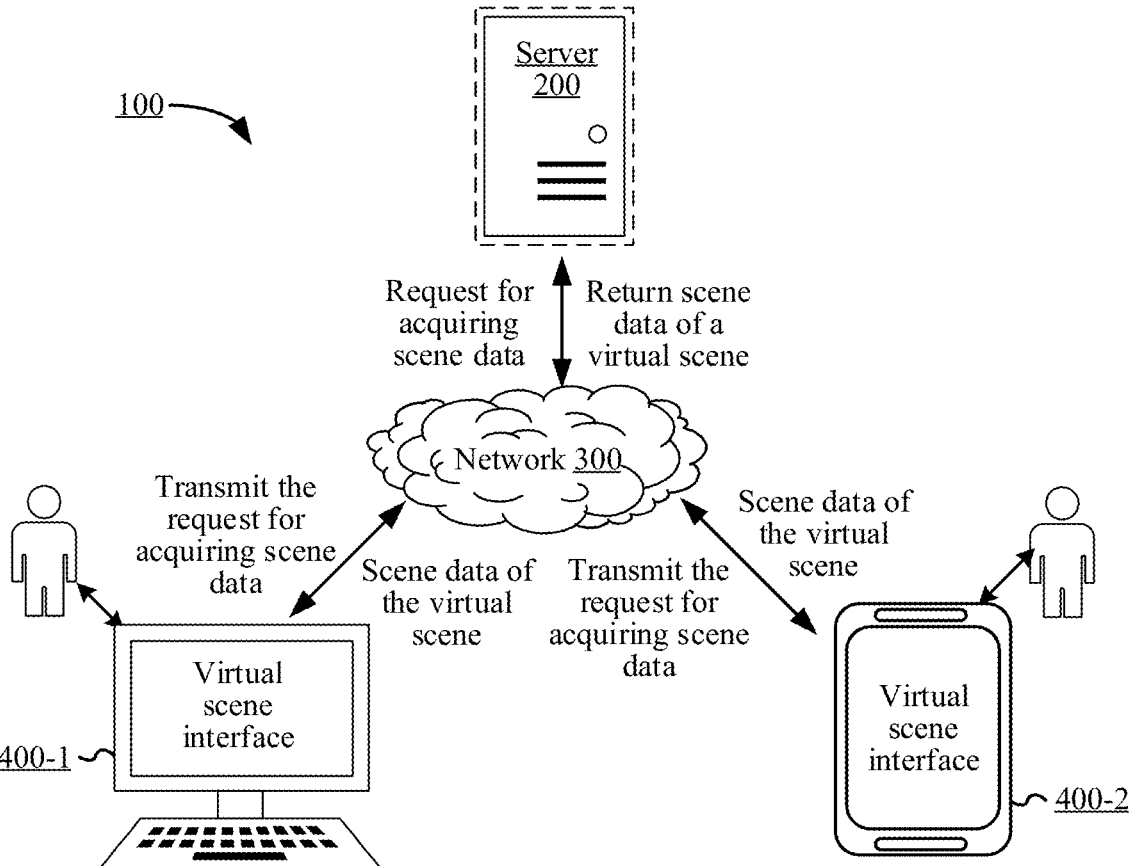
FIG. 1 is a schematic architectural diagram of a system 100 for controlling a called object in a virtual scene according to an embodiment of this disclosure.

To make the objectives, technical solutions, and advantages of this disclosure clearer, the following describes this disclosure in further detail with reference to the accompanying drawings. The described embodiments are not to be considered as a limitation to this disclosure. Other embodiments are within the scope of this disclosure.

In the following description, the term "some embodiments" describes subsets of all possible embodiments, but it may be understood that "some embodiments" may be the same subset or different subsets of all the possible embodiments, and can be combined with each other without conflict.

In the following description, the terms "first", "second", and "third" are merely intended to distinguish between similar objects rather than describe a specific order of objects. It may be understood that the "first", "second", and "third" are interchangeable in order in proper circumstances, so that the embodiments of this disclosure described herein can be implemented in an order other than the order illustrated or described herein.

Unless otherwise defined, meanings of all technical and scientific terms used in this specification are the same as those usually understood by a person skilled in the art to which this disclosure belongs. The terms used in this specification are merely intended to describe objectives of the embodiments of this disclosure, but are not intended to limit this disclosure.

Before the embodiments of this disclosure are further described in detail, examples of nouns and terms in the embodiments of this disclosure are described, and the following explanations are applicable to the nouns and terms in the embodiments of this disclosure.

(1) Client may include an application program running on a terminal for providing various services, for example, a client supporting virtual scenes (for example, a game client).

(2) In response to may be used for indicating a condition or a state on which an executed operation depends. When a condition or a state on which one or more executed operations depend is met, the one or more operations may be performed in real time or with a specified delay. An execution order of a plurality of executed operations is not limited, unless otherwise stated.

(3) Virtual scene may include a virtual scene displayed (or provided) when an application program runs on a terminal. The virtual scene may be a simulated environment of the real world, a semi-simulated and semi-fictional virtual environment, or a purely fictional virtual environment. The virtual scene may be any one of a two-dimensional virtual scene, a 2.5-dimensional virtual scene, or a three-dimensional virtual scene. A dimension of the virtual scene is not limited in the embodiments of this disclosure.

For example, when the virtual scene is a three-dimensional virtual space, the three-dimensional virtual space may be an open space, and the virtual scene may be used for simulating a real environment in the reality. For example, the virtual scene may include sky, land, sea, and the like, and the land may include environmental elements such as desert and a city. The virtual scene may further include virtual objects, for example, a building, a vehicle, and an item such as a weapon required for a virtual object in the virtual scene to arm the virtual object or fight with another virtual object. The virtual scene may be further used for simulating real environments in different weather, such as sunny, rainy, foggy, or dark weather. A user may control movement of a virtual object in the virtual scene.

(4) Virtual object may include an image of any person or object that can perform interaction in a virtual scene, or a movable object in a virtual scene. The movable object may be a virtual character, a virtual animal, or an animation character, for example, a character, an animal, a plant, an oil barrel, a wall, or a rock displayed in a virtual scene. The virtual object may be a virtual image used for representing a user in the virtual scene. The virtual scene may include a plurality of virtual objects, and each virtual object has a shape and a volume in the virtual scene, and occupies some space in the virtual scene.

In embodiments of this disclosure, the virtual object may be a player character controlled by using an operation on a client, artificial intelligence (AI) configured in a virtual scene combat through training, or a non-player character (NPC) configured in interaction in the virtual scene. The virtual object may be a virtual character performing adversarial interaction in a virtual scene. The number of virtual objects participating in interaction in the virtual scene may be preset or dynamically determined according to the number of clients participating in the interaction.

Using a shooting game as an example, in the virtual scene, a user may control the virtual object to fall freely, glide, or fall after a parachute is opened in the sky, or to run, jump, creep, bend forward in the land; or control the virtual object to swim, float, or dive in the ocean. The user may alternatively control the virtual object to ride in a virtual vehicle to move in the virtual scene. For example, the virtual vehicle may be a virtual car, a virtual aircraft, or a virtual yacht. The foregoing scenarios are merely used as examples herein. This is not specifically limited in the embodiments of this disclosure. The user may alternatively control the virtual object to perform adversarial interaction with another virtual object by using a virtual item. For example, the virtual item may be a throwing virtual item such as a grenade, a cluster mine, or a sticky grenade, or may be a shooting virtual item such as a machine gun, a pistol, or a rifle.

(5) Called object may include an image of any person or object that can assist a virtual object in interacting with another virtual object in a virtual scene. The image may be a virtual character, a virtual animal, an animation character, a virtual item, a virtual vehicle, or the like.

(6) Scene data may include data representing various features of an object that are presented during interaction in a virtual scene. For example, the scene data may include a location of the object in the virtual scene. Different types of features may be included according to a type of a virtual scene. For example, in a virtual scene of a game, scene data may include a waiting time required for various functions configured in the virtual scene (depending on the number of times that the same function can be used within a specific period of time), and may further represent attribute values of various states of a game character, such as a health value (an energy value, also referred to as a red value) and a magic value (also referred to as a blue value).

Based on the foregoing explanations of the nouns and terms in the embodiments of this disclosure, the following describes a system for controlling a called object in a virtual scene according to an embodiment of this disclosure. FIG. 1 is a schematic architectural diagram of a system 100 for controlling a called object in a virtual scene according to an embodiment of this disclosure. To support an example application, a terminal (a terminal 400-1 and a terminal 400-2 are shown as an example) is connected to a server 200 through a network 300. The network 300 may be a wide area network, a local area network, or a combination thereof, and transmit data through a wireless or wired link.

The terminal (including the terminal 400-1 and the terminal 400-2) is configured to receive, based on a view interface, a trigger operation for entering a virtual scene, and transmit a request to server 200 to obtain scene data of the virtual scene.

The server 200 is configured to receive the request for acquiring the scene data, and return the scene data of the virtual scene to the terminal in response to the request.

The terminal (including the terminal 400-1 and the terminal 400-2) is configured to receive the scene data of the virtual scene, render a virtual scene interface based on the scene data, and present the virtual scene interface on a graphical interface (a graphical interface 410-1 and a graphical interface 410-2 are shown as an example). An object interaction environment, an interaction object, and the like may be further presented on the virtual scene interface.

Content presented on the virtual scene interface is obtained through rendering based on the returned scene data of the virtual scene.

During practical application, the server 200 may be an independent physical server, or may be a server cluster or a distributed system that includes a plurality of physical servers, or may be a cloud server that provides basic cloud computing services such as a cloud service, a cloud database, cloud computing, a cloud function, cloud storage, a network service, cloud communication, a middleware service, a domain name service, a security service, a CDN, big data, and an artificial intelligence platform. The terminal (for example, the terminal 400-1 and the terminal 400-2) may be a smartphone, a tablet computer, a notebook computer, a desktop computer, a smart speaker, a smart television, a smartwatch, or the like, but is not limited thereto. The terminal (for example, the terminal 400-1 and the terminal 400-2) and the server 200 may be directly or indirectly connected in a wired or wireless communication manner. This is not limited in this disclosure.

During practical application, an application program that supports a virtual scene is installed and run on the terminal (including the terminal 400-1 and the terminal 400-2). Examples of the application program include any one of a first-person shooting (FPS) game, a third-person shooting game, a multiplayer online battle arena (MOBA) game, a two-dimensional (2D) game application, a three-dimensional (3D) game application, a virtual reality application program, a three-dimensional map program, or a multiplayer gun battle survival game. Alternatively, the application program may be a standalone application program, for example, a standalone 3D game program.

The virtual scene in this embodiment of this disclosure may be used for simulating a three-dimensional virtual space. The three-dimensional virtual space may be an open space. The virtual scene may be used for simulating a real environment in the reality. For example, the virtual scene may include sky, land, sea, and the like, and the land may include environmental elements such as desert and a city. The virtual scene may further include virtual objects, for example, a building, a table, a vehicle, and an item such as a weapon required for a virtual object in the virtual scene to arm the virtual object or fight with another virtual object. The virtual scene may be further used for simulating real environments in different weather, such as sunny, rainy, foggy, or dark weather. The virtual object may be a virtual image used for representing a user in the virtual scene. The virtual image may be in any form, for example, a simulated character or a simulated animal. This is not limited in this disclosure. During actual implementation, the user may control movement of the virtual object in the virtual scene by using the terminal. The movement includes but is not limited to at least one of body posture adjustment, crawling, running, riding, jumping, driving, picking, shooting, attacking, throwing, and cutting/poking.

Using a video game scene as an example, the user may perform an operation on the terminal in advance. After the terminal detects the operation of the user, a game configuration file of a video game may be downloaded, and the game configuration file may include an application program, interface display data, virtual scene data, or the like of the video game, so that the user may invoke the game configuration file while logging in to the video game on the terminal, to render and display an interface of the video game. The user may perform a touch operation on the terminal, and after detecting the touch operation, the terminal may determine game data corresponding to the touch operation and render and display the game data. The game data may include virtual scene data, behavioral data of a virtual object in the virtual scene, and the like.

During practical application, the terminal presents, on a virtual scene interface obtained through rendering based on the acquired scene data, a target virtual object (for example, a virtual image corresponding to a game player logging in to the video game) holding a virtual item in the virtual scene, and a called object corresponding to the target virtual object (for example, a virtual shield or virtual armor). The target virtual object is controlled to use a virtual item (for example, a virtual gun) to select a lock target in the virtual scene (for example, a virtual image corresponding to another game player or a non-player character in the video game scene). A lock command is received for the selected lock target. In response to the lock command, the called object is controlled to be in an interactive assistance state matching the lock target, and the called object in the interactive assistance state is controlled to perform a corresponding assistance operation (for example, an attack operation) on the lock target, so as to control the called object to assist, through the assistance operation, the target virtual object in interacting with another virtual object.

Figure 2:
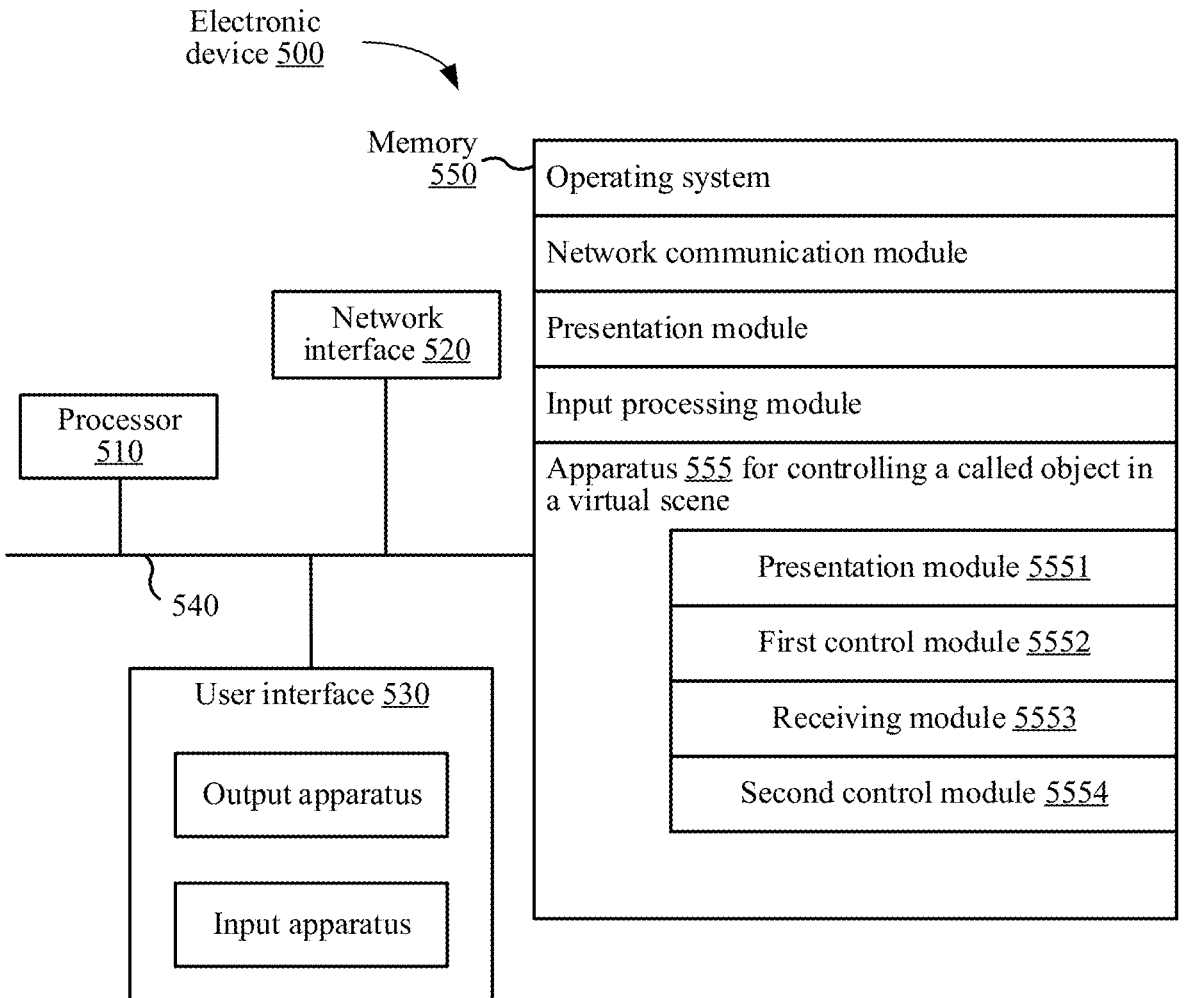
FIG. 2 is a schematic structural diagram of an electronic device 500 for implementing a method for controlling a called object in a virtual scene according to an embodiment of this disclosure.

FIG. 2 is a schematic structural diagram of an electronic device 500 for implementing a method for controlling a called object in a virtual scene according to an embodiment of this disclosure. During practical application, the electronic device 500 may be the server or the terminal shown in FIG. 1. An electronic device for implementing a method for controlling a called object in a virtual scene in the embodiments of this disclosure is described by using an example in which the electronic device 500 is the terminal shown in FIG. 1. The electronic device 500 provided in this embodiment of this disclosure includes: processing circuitry (such as at least one processor 510), a memory 550, at least one network interface 520, and a user interface 530. The components in the electronic device 500 are coupled together through a bus system 540. It may be understood that the bus system 540 is configured to implement connection and communication between the components. In addition to a data bus, the bus system 540 further includes a power bus, a control bus, and a state signal bus. However, for ease of clear description, all types of buses in FIG. 2 are marked as the bus system 540.

In some embodiments, an apparatus for controlling a called object in a virtual scene in the embodiments of this disclosure may be implemented by using software. FIG. 2 shows an apparatus 555 for controlling a called object in a virtual scene that is stored in the memory 550. The apparatus 555 may be software in the form of a program or a plug-in, and includes the following software modules: a presentation module 5551, a first control module 5552, a receiving module 5553, and a second control module 5554. These modules are logical modules, and therefore may be flexibly combined or further split according to an implemented function. Functions of the modules are described below.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

In some embodiments, a human-computer interaction engine used for implementing the method for controlling a called object in a virtual scene is installed on the apparatus 555 for controlling a called object in a virtual scene. The human-computer interaction engine includes functional modules, components, or plug-ins used for implementing the method for controlling a called object in a virtual scene. FIG. 3 is a schematic diagram of a principle of a human-computer interaction engine installed on an apparatus for controlling a called object in a virtual scene according to an embodiment of this disclosure. As shown in FIG. 3, for example, the virtual scene is a game scene, and correspondingly, the human-computer interaction engine is a game engine.

The game engine may include a set of code (commands) that is designed for a machine running a specific type of game and that can be recognized by the machine. Like an engine, the game engine controls operation of the game. A game program may be divided into two parts: a game engine and game resources. The game resources include images, sound, animations, and other parts, that is, a game=an engine (program code)+resources (images, sound, animations, and the like). The game engine invokes these resources in order according to a game design requirement.

The method for controlling a called object in a virtual scene in the embodiments of this disclosure may be implemented by the modules in the apparatus for controlling a called object in a virtual scene shown in FIG. 2 by invoking related modules, components, or plug-ins of the game engine shown in FIG. 3. Modules, components, or plug-ins included in the game engine shown in FIG. 3 are described below as an example.

As shown in FIG. 3, the game engine includes: (1) a virtual camera, which in some embodiments is a necessary component of a game scene picture, configured to present the game scene picture. A game scene corresponds to at least one virtual camera, and there may be two or more virtual cameras according to an actual requirement. The virtual camera serves as a game rendering window to capture and present picture content in the game world for a player. A parameter of the virtual camera may be set to adjust the player's view of the game world, for example, a first-person view or a third-person view.

(2) A scene organization configured to manage the game scene, for example, perform collision detection or visibility elimination. The collision detection may be implemented by using a collider. The collider may be implemented by using an axis-aligned bounding box (AABB) or an oriented bounding box (OBB) according to an actual requirement. The visibility elimination may be implemented based on a viewing frustum. The viewing frustum is a three-dimensional frame generated according to a virtual camera, and is used for cropping an object beyond a visual range of the camera. An object within the viewing frustum is projected to a visual plane, and an object beyond the viewing frustum is discarded without processing.

(3) A terrain manager may include a component for terrain management in the game scene and configured to create and edit a game terrain, for example, create a terrain such as a mountain, a canyon, or a cave in the game scene.

(4) An editor may include an assistance tool in game design, including:

a scene editor, configured to edit content of the game scene, for example, change a terrain, customize vegetation distribution, or edit lighting layout;

a model editor, configured to create and edit a model in a game (a character model in the game scene);

a special effect editor, configured to edit a special effect on a game picture; and an action editor, configured to define and edit an action of a character on a game picture.

(5) A special effect component configured to create and edit a special effect of a game on a game picture. During practical application, a particle special effect and a texture UV animation may be used for implementation. The particle special effect means combining countless single particles to make them present a fixed form, and controlling movement of all particles or a single particle by using a controller or a script to simulate water, fire, fog, gas, and other effects in the reality. The UV animation is a texture animation implemented by dynamically modifying UV coordinates of a map.

(6) A bone or skeleton animation may include an animation implemented by using a built-in bone to drive an object to move. The bone animation may be understood as the following two concepts:

a bone may include an abstract concept used for controlling a skin, for example, a bone of a human body controls skin; and a skin may include a factor that is controlled by the bone and that is displayed externally, for example, skin of a human body is affected by a bone.

(7) A morph animation may include an animation implemented by adjusting a vertex of a basic model.

(8) A UI control may include a control configured to implement display of a game picture.

(9) An underlying algorithm may include an algorithm that needs to be invoked for implementing a function in the game engine, for example, a graphics algorithm required for implementing the scene organization, and matrix transformation and vector transformation required for implementing the bone animation.

(10) A rendering component may include a component necessary for presenting an effect of a game picture. By using the rendering component, a scene described by using a three-dimensional vector is transformed into a scene described by using a two-dimensional pixel. Model rendering and scene rendering are included.

(11) A* pathfinding may include an algorithm used for finding the shortest path during path planning, pathfinding, and graph traversal in game design.

For example, the presentation module 5551 may implement interaction between a user and a game by invoking the UI control in the game engine shown in FIG. 3; create a two-dimensional or three-dimensional model by invoking the morph animation part in the game engine; after the model is created, assign a texture map to the model according to different sides by using the bone animation part, where this is equivalent to applying skin to a bone; and finally, calculate effects such as models, animations, light, and special effects in real time by using the rendering component, and display the effects on a human-computer interaction interface. During practical application, the presentation module 5551 may render virtual scene data by invoking the rendering component in the game engine shown in FIG. 3, and then present, on an interface of a rendered virtual scene, a target virtual object holding a virtual item in the virtual scene, and a called object corresponding to the target virtual object.

The first control module 5552 may control, by invoking the UI control in the game engine shown in FIG. 3, the target virtual object to use the virtual item to select a lock target in the virtual scene.

The receiving module 5553 may receive a lock command for the selected lock target by invoking the UI control in the game engine shown in FIG. 3.

In response to the lock command, the second control module 5554 may determine the lock target locked by the lock command by invoking the scene organization part in the game engine shown in FIG. 3 to perform collision detection, and determine an interactive assistance state matching the lock target; and then control, by using the underlying algorithm part and the A* pathfinding part, the called object to be in the interactive assistance state matching the lock target, and controlling the called object is in the interactive assistance state to perform a corresponding assistance operation on the lock target, so as to control the called object to assist, by executing the assistance operation, the target virtual object in interacting with another virtual object.

Based on the foregoing descriptions of the system for controlling a called object in a virtual scene and the electronic device in the embodiments of this disclosure, the following describes a method for controlling a called object in a virtual scene in the embodiments of this disclosure. In some embodiments, the method for controlling a called object in a virtual scene in the embodiments of this disclosure may be independently implemented by a server or a terminal, or may be jointly implemented by a server and a terminal. The following describes the method for controlling a called object in a virtual scene in the embodiments of this disclosure by using implementation by a terminal as an example.

FIG. 4 is a schematic flowchart of a method for controlling a called object in a virtual scene according to an embodiment of this disclosure. The method for controlling a called object in a virtual scene in this embodiment of this disclosure includes the following steps:

In step 101, a terminal presents a target virtual object holding a virtual item in a virtual scene, and a called object corresponding to the target virtual object.

Herein, a client supporting a virtual scene is installed on the terminal. When a user starts the client on the terminal and the terminal runs the client, the terminal presents a virtual scene interface obtained by observing a virtual scene from the perspective of the target virtual object, and presents the target virtual object holding the virtual item on the virtual scene interface. The target virtual object is a virtual object in a virtual scene corresponding to a current user account. In this virtual scene, a user may control, based on the virtual scene interface, the target virtual object holding the virtual item to interact with another virtual object (for example, a virtual object of another user or an NPC in the virtual scene), for example, control the target virtual object holding the virtual item (for example, a virtual sniper gun, a virtual submachine guns, or a virtual shotgun) to shoot the another virtual object.

In this embodiment of this disclosure, the terminal further presents the called object corresponding to the target virtual object while presenting the target virtual object holding the virtual item. Herein, the called object is an image of any person or object for assisting the target virtual object in interacting with the another virtual object in the virtual scene. The image may be a virtual character, a virtual animal, an animation character, a virtual item, a virtual vehicle, or the like. The called object may be a called object randomly allocated by a system to the target virtual object when the user enters the virtual scene for the first time, or may be a called object called by the user by controlling the target virtual object to perform some specific tasks according to scene guidance information in the virtual scene to meet a calling condition of the called object, or may be a called object called by the user by triggering a calling control, for example, the user clicks the calling control to call the called object in a case that the calling condition is met.

Figure 5:
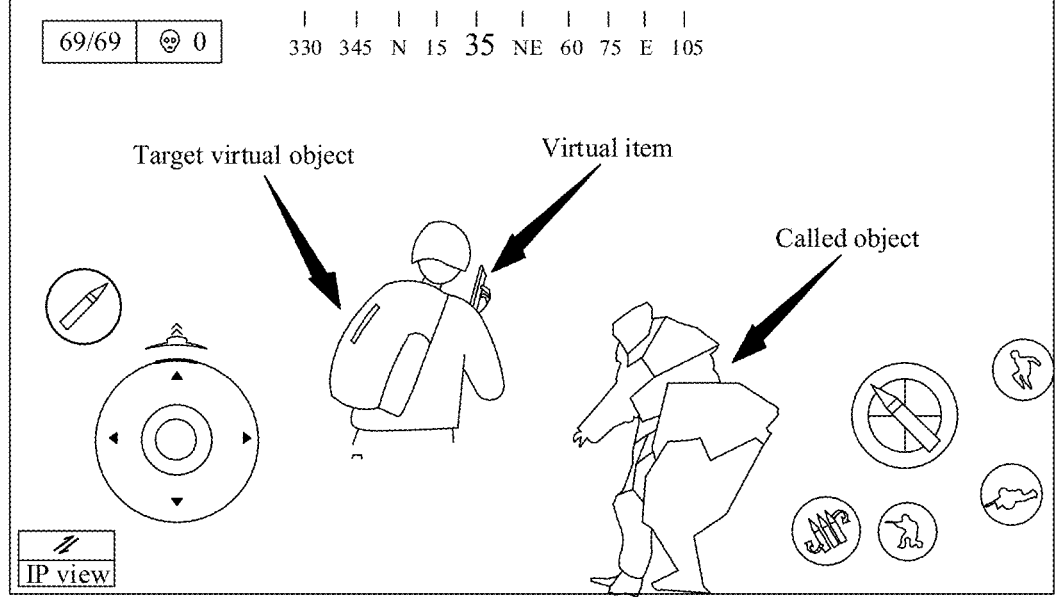
FIG. 5 is a schematic diagram of presentation of a virtual scene interface according to an embodiment of this disclosure.

In an example, FIG. 5 is a schematic diagram of presentation of a virtual scene interface according to an embodiment of this disclosure. Herein, the virtual scene is a video shooting game scene. The terminal presents a virtual scene interface; presents, on the virtual scene interface, a target virtual object holding a virtual item (that is, a virtual shooting item); and presents a called object corresponding to the target virtual object, that is, a virtual shield called object.

In some embodiments, the terminal may call the called object corresponding to the target virtual object in the following manner: when a virtual chip used for calling the called object exists in the virtual scene, controlling the target virtual object to pick up the virtual chip; acquiring an attribute value of the target virtual object; and calling, based on the virtual chip, the called object corresponding to the target virtual object when it is determined, based on the attribute value, that a calling condition corresponding to the called object is met.

Herein, the virtual chip used for calling the called object may be preconfigured in the virtual scene, and the virtual chip may exist at a specific location in the virtual scene, that is, the user may assemble the virtual chip by performing a picking operation. During practical application, an assembly function item corresponding to the virtual chip may alternatively be set on a scene setting interface of the virtual scene before the user enters the virtual scene, that is, the user may assemble the virtual chip by using the assembly function item on the scene setting interface for use after entering the virtual scene.

After controlling the target virtual object to assemble the virtual chip, the terminal acquires an attribute value of the target virtual object, for example, a health value or an energy value of the target virtual object; then determines whether the attribute value of the target virtual object meets the calling condition corresponding to the called object, for example, whether the energy value of the target virtual object exceeds 500 points; and calls, based on the assembled virtual chip, the called object corresponding to the target virtual object when it is determined, based on the attribute value, that the calling condition corresponding to the called object is met (that is, the energy value of the target virtual object exceeds 500 points).

During practical application, the calling condition corresponding to the called object may alternatively include: whether interaction is performed with a target virtual monster (for example, an elite monster in a virtual state (a health value is less than a preset threshold). When it is determined that the calling condition corresponding to the called object is met (that is, interaction is performed with the target virtual monster), the called object corresponding to the target virtual object is called based on the assembled virtual chip.

During actual implementation, the called object can be called when at least one of the foregoing exemplary calling conditions is met, for example, all of the foregoing exemplary calling conditions are met, or only one or two of the foregoing exemplary calling conditions are met. This is not limited in this embodiment of this disclosure.

In step 102, control the target virtual object to use the virtual item to select a lock target in the virtual scene.

Herein, after presenting the target virtual object holding the virtual item and the called object corresponding to the target virtual object, the terminal may control the target virtual object to use the virtual item to select the lock target in the virtual scene, to perform interaction. The lock target may be another virtual object different from the target virtual object in the virtual scene, or may be a scene location in the virtual scene, for example, a hillside, sky, or a tree in the virtual scene.

During practical application, the virtual item may correspond to a corresponding front sight pattern (for example, a front sight pattern of a virtual shooting gun), to control the target virtual object to select the lock target by using the front sight pattern of the virtual item. The virtual item may alternatively emit a virtual laser ray (for example, a laser ray from a virtual laser gun), to control the target virtual object to select the lock target by using the laser ray from the virtual item.

In some embodiments, the terminal may control, in the following manner, the target virtual object to use the virtual item to select the lock target in the virtual scene: presenting a front sight pattern corresponding to the virtual item; controlling the target virtual object to use the virtual item to perform an aiming operation on the lock target; and controlling the front sight pattern to synchronously move toward the lock target, and selecting the lock target in the virtual scene when the front sight pattern moves to the lock target.

Herein, the terminal selects the lock target by using the virtual item with the front sight pattern. The terminal further presents the front sight pattern corresponding to the virtual item when presenting the target virtual object holding the virtual item. In this way, the terminal controls the target virtual object to use the virtual item to perform the aiming operation on the lock target, and controls the front sight pattern to synchronously move to the lock target during execution of the aiming operation, so as to select the lock target in the virtual scene.

Herein, during practical application, when duration in which the front sight pattern stays at the lock target reaches a duration threshold, it is determined that a lock command is received, so that the lock target is automatically locked. The lock command may alternatively be triggered by using a control. To be specific, when the front sight pattern moves to the lock target, a lock command is received in response to a trigger operation performed on the control, so that the lock target is automatically locked.

In step 103, receive a lock command for the selected lock target.

Herein, the user may trigger the lock command for the lock target after controlling the target virtual object to use the virtual item to select the lock target in the virtual scene, and the terminal receives the lock command for the selected lock target.

In some embodiments, the terminal may receive the lock command for the selected lock target in the following manner: presenting an operation control used for locking the lock target; and receiving the lock command for the selected lock target in response to a trigger operation performed on the operation control.

Herein, the terminal may present an operation control used for locking the lock target, and the user may trigger the operation control to lock the lock target. When receiving the trigger operation performed on the operation control, the terminal receives the lock command for the selected lock target in response to the trigger operation.

Figure 6:
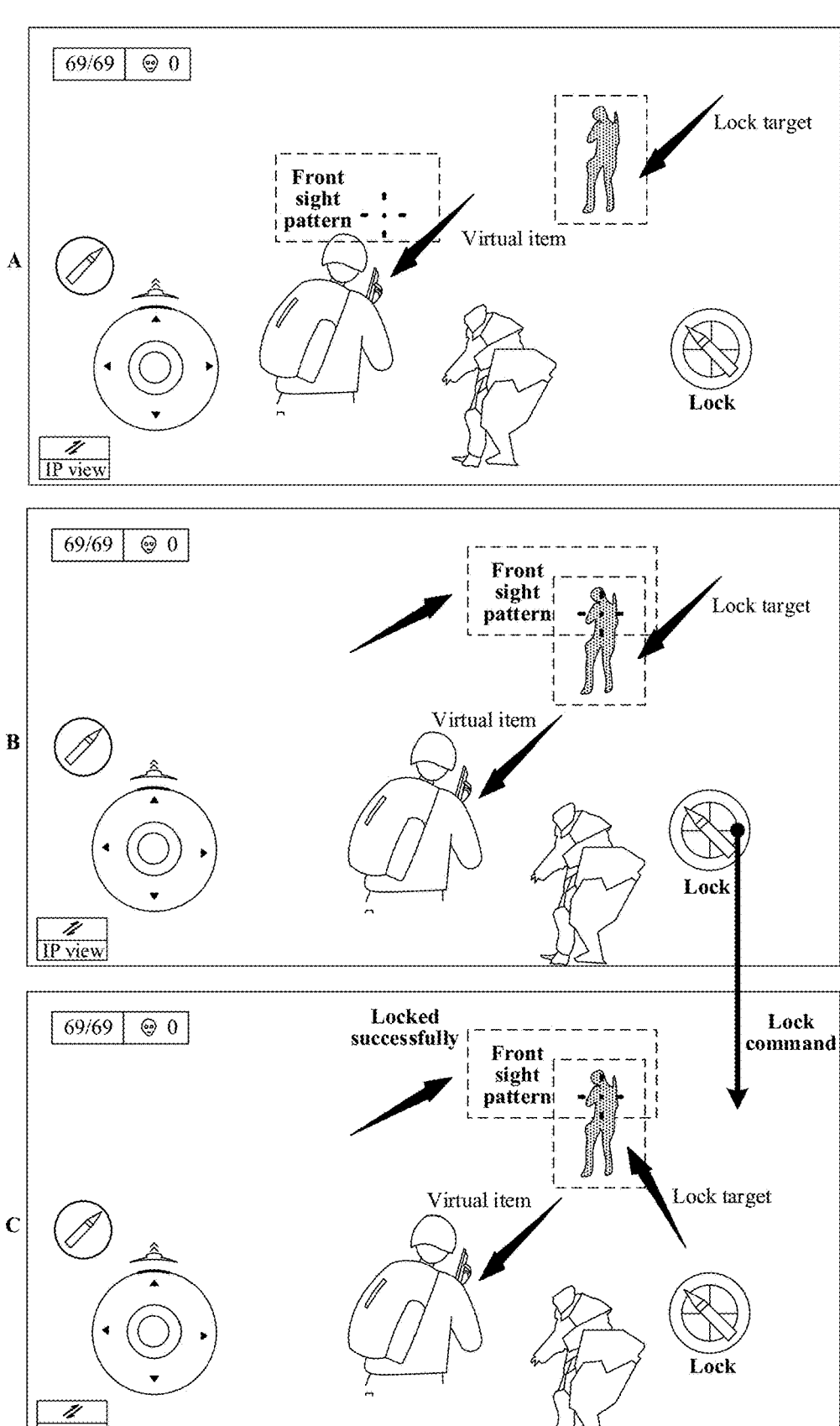
FIG. 6 is a schematic flowchart of locking a lock target according to an embodiment of this disclosure.

In an example, FIG. 6 is a schematic flowchart of locking a lock target according to an embodiment of this disclosure. Herein, the terminal presents the front sight pattern corresponding to the virtual item, and presents a "Lock" operation control used for locking the lock target, as shown in a diagram A in FIG. 6; controls the target virtual object to use the virtual item to perform the aiming operation on the lock target, and controls the front sight pattern to synchronously move to the lock target during execution of the aiming operation, as shown in a diagram B in FIG. 6; and when the front sight pattern is controlled to move to the lock target, receives the lock command for the selected lock target in response to the trigger operation performed on the operation control. In this case, the lock target is successfully locked, and prompt information "Locked successfully" is also presented for indicating that the lock target is locked, as shown in a diagram C in FIG. 6.

In step 104, control the called object to be in an interactive assistance state matching the lock target in response to the lock command, and control the called object in the interactive assistance state to perform a corresponding assistance operation on the lock target.

The called object in the interactive assistance state is used for assisting, through the assistance operation, the target virtual object in interacting with another virtual object.

Herein, after receiving the lock command for the lock target, in response to the lock command, the terminal controls the called object to be in the interactive assistance state, such as a protection assistance state or an attack assistance state, that matches the lock target; and controls the called object in the interactive assistance state to perform the corresponding assistance operation, such as an attack operation, on the lock target, so as to assist the target virtual object in interacting with the another virtual object.

During practical application, the lock target may be another virtual object different from the target virtual object in the virtual scene, or may be a scene location in the virtual scene, for example, a hillside, sky, or a tree in the virtual scene. Therefore, for different lock targets, different interactive assistance states are set in this embodiment of this disclosure, such as the protection assistance state and the attack assistance state.

In some embodiments, the terminal may present the called object corresponding to the target virtual object in the following manner: presenting a called object in a following state of moving along with the target virtual object. Correspondingly, the terminal may control, in the following manner, the called object to be in the interactive assistance state matching the lock target: controlling the called object to switch from the following state to the interactive assistance state matching the lock target in response to the lock command.

During practical application, after the terminal controls the target virtual object to successfully call the called object, the called object may move along with the target virtual object by default. That is, the terminal presents, on the virtual scene interface, the called object in the following state of moving along with the target virtual object. During practical application, the called object may move along with the target virtual object within a preset following range. The preset following range may be a sector area that uses the target virtual object as a center and that has a preset angle, and may be located at the rear right or rear left of the target virtual object, or the like.

Based on this, when controlling the called object to be in the interactive assistance state matching the lock target, the terminal controls the called object to switch from the following state to the interactive assistance state matching the lock target in response to the lock command for the lock target.

When the lock target is another virtual object in the virtual scene, in some embodiments, the terminal may control, in the following manner, the called object in the interactive assistance state to perform the corresponding assistance operation on the lock target: acquiring a distance between the called object and the lock target; and when the distance is less than a target distance, controlling the called object in the interactive assistance state to perform the corresponding assistance operation on the lock target; or when the distance is not less than the target distance, controlling the called object to move toward a first target area corresponding to the lock target, and when the called object moves to the first target area, controlling the called object in the interactive assistance state to perform the corresponding assistance operation on the lock target.

Herein, when the lock target is another virtual object in the virtual scene, in response to the lock command for the lock target, the terminal controls the called object to be in the interactive assistance state, such as the attack assistance state, that matches the lock target, so as to control the called object in the interactive assistance state to perform the corresponding assistance operation on the lock target.

During practical application, when the terminal controls the called object to perform the corresponding assistance operation on the lock target, to ensure execution accuracy of the assistance operation, the terminal first acquires a distance between the called object and the lock target, and then determines a relationship between the acquired distance and a preset target distance. The target distance may be an interaction distance corresponding to the called object, that is, a maximum distance at which the called object can perform an assistance operation on the lock target. In this case that the distance is less than the target distance, it indicates that the lock target is within the interaction distance of the called object. In this case, the called object in the interactive assistance state is controlled to directly perform the corresponding assistance operation on the lock target. When the distance is not less than the target distance, it indicates that the lock target is beyond the interaction distance of the called object. In this case, the called object is to be controlled to move toward the first target area corresponding to the lock target. In addition, when the called object moves to the first target area, the called object in the interactive assistance state is then controlled to perform the corresponding assistance operation on the lock target.

During practical application, the called object in the interactive assistance state may bypass an obstacle in the virtual scene through running by using a pathfinding algorithm, and move toward the first target area corresponding to the lock target. The first target area is an area in which the lock target is located, for example, may be a circle with the lock target as a center and a preset distance as a radius. The preset distance may be an attack distance corresponding to the called object, that is, a maximum distance at which the called object can perform an assistance operation on the lock target.

In some embodiments, the terminal may control, in the following manner, the called object to move toward the first target area: controlling the called object to move toward a second target area including the first target area, and controlling the called object to be in an interactive preparation state when the called object moves to the second target area, where the called object holds a virtual assistance item; and controlling the called object in the interactive preparation state to move from the second target area toward the first target area, and during movement from the second target area toward the first target area, when the lock target moves, controlling an orientation of the virtual assistance item to be directly facing the lock target by adjusting an orientation of the called object in the interactive preparation state with respect to the lock target.

Herein, during practical application, the first target area and the second target area may be two squares with the same target point as a center, or two circles with the same target point as a center. In addition, the second target area includes the first target area, and the target point indicates the lock target. When the called object is controlled to move to the first target area, the called object needs to pass the second target area. In this embodiment of this disclosure, when the called object is controlled to move to the second target area, the called object is controlled to be in the interactive preparation state, so as to help quickly and accurately perform an assistance operation when the called object is controlled to move to the first target area. During actual implementation, when the called object is in the interactive preparation state, a moving speed may be less than a previous moving speed. In addition, during movement from the second target area to the first target area, the called object may be further controlled to adjust an orientation with respect to the lock target according to a movement status of the lock target, so as to ensure that the virtual assistance item held by the called object faces the lock target. In this way, the called object can be controlled to accurately perform an assistance operation on the lock target based on the virtual assistance item. Herein, the interactive preparation state is a sub-state of the interactive assistance state.

Figure 7:
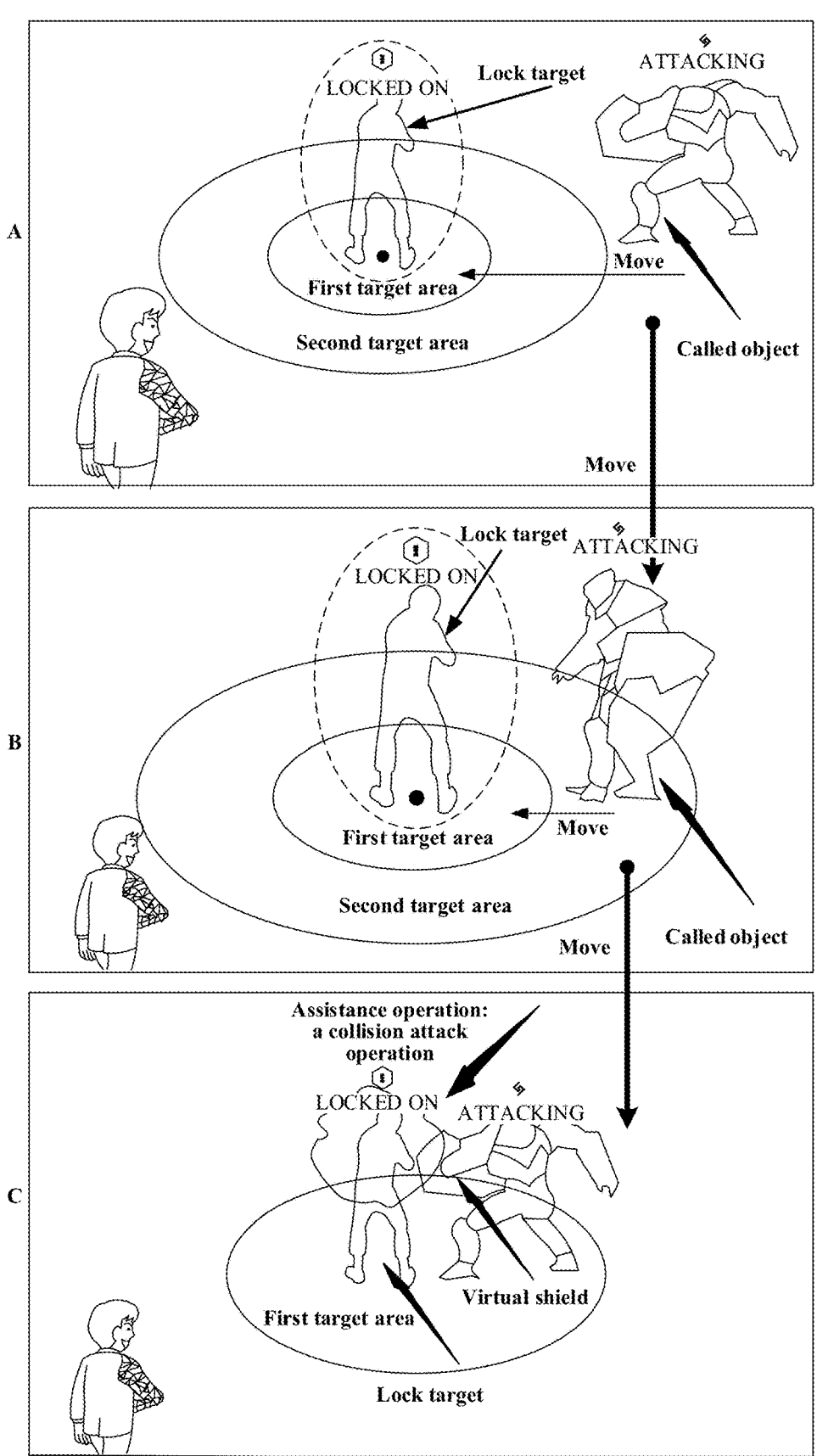
FIG. 7 is a schematic diagram of presentation of controlling a called object to perform an assistance operation according to an embodiment of this disclosure.

In an example, FIG. 7 is a schematic diagram of presentation of controlling a called object to perform an assistance operation according to an embodiment of this disclosure. Herein, the terminal controls the called object to move toward the lock target, and when the called object moves to the second target area, reduces the moving speed, that is, enters the interactive preparation state, as shown in a diagram A and a diagram B in FIG. 7; and continues to control the called object to move from the second target area to the first target area, and when the called object moves to the first target area, controls the called object to use the virtual assistance item (namely, a virtual shield) to perform an assistance operation on the lock target, that is, controls the called object to perform a collision attack operation on the lock target.

When the lock target is another virtual object in the virtual scene, in some embodiments, the terminal may control, in the following manner, the called object in the interactive assistance state to perform the corresponding assistance operation on the lock target: acquiring a skill state of a virtual skill corresponding to the called object; and when the skill state represents that the virtual skill is in an active state, controlling the called object in the interactive assistance state to perform, on the lock target, an assistance operation corresponding to the virtual skill.

Herein, when the lock target is another virtual object in the virtual scene, in response to the lock command for the lock target, the terminal controls the called object to be in the interactive assistance state, such as the attack assistance state, that matches the lock target, so as to control the called object in the interactive assistance state to perform the corresponding assistance operation on the lock target. When the called object is in the interactive assistance state matching the lock target (namely, another virtual object), the called object may perform an assistance operation corresponding to the interactive assistance state. In this embodiment of this disclosure, a corresponding virtual skill is set for the interactive assistance state. To be specific, when the called object is in the interactive assistance state matching the lock target (namely, another virtual object), an assistance operation corresponding to the virtual skill may be performed on the lock target. For example, the virtual skill is an attack skill. In this case, an attack assistance operation corresponding to the attack skill is performed on the lock target.

Figure 8:
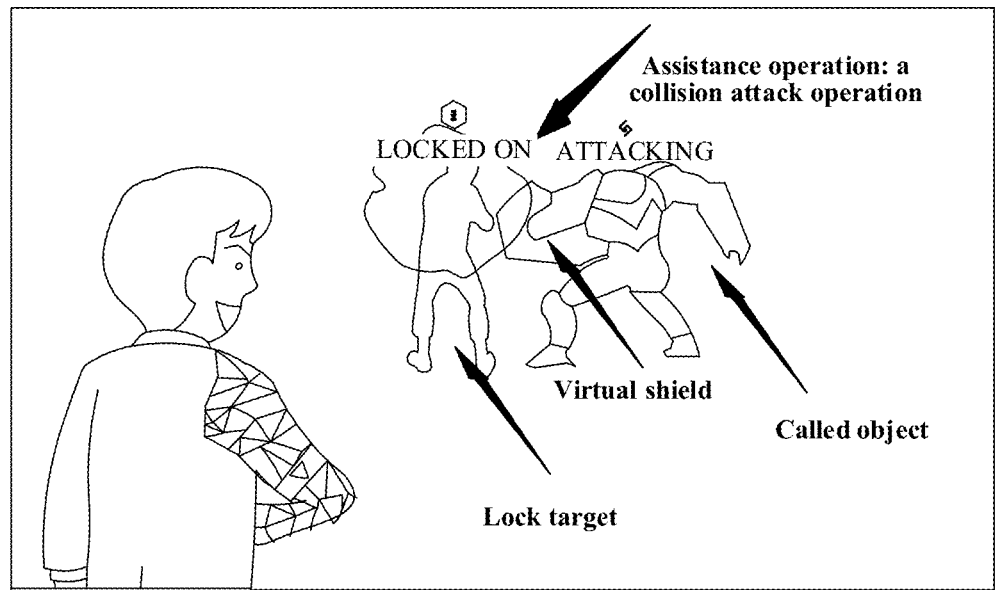
FIG. 8 is a schematic diagram of presentation of an assistance operation according to an embodiment of this disclosure.

During practical application, the skill state of the virtual skill corresponding to the called object may be acquired, where the skill state includes an active state and an inactive state. When the skill state represents that the virtual skill is in the active state, the called object in the interactive assistance state is controlled to perform, on the lock target, an assistance operation, such as an attack operation, that corresponds to the virtual skill. In an example, FIG. 8 is a schematic diagram of presentation of an assistance operation according to an embodiment of this disclosure. Herein, the called object uses the virtual assistance item (namely, a virtual shield) to perform an assistance operation on the lock target, that is, the called object is controlled to perform a collision attack operation on the lock target.

In some embodiments, after execution of the assistance operation corresponding to the virtual skill is completed, the terminal may control the virtual skill to switch from the active state to an inactive state, and present remaining duration in which the virtual skill is in the inactive state; and when the remaining duration reaches a remaining duration threshold or becomes zero, control the virtual skill to switch from the inactive state to an active state, and control the called object to perform, on the lock target again, an assistance operation corresponding to the virtual skill.

During practical application, corresponding duration is set for each of the active state and the inactive state of the virtual skill. After the terminal controls the called object in the interactive assistance state to perform, on the lock target, the assistance operations corresponding to the virtual skill, that is, after execution of the assistance operations corresponding to the virtual skill is completed, the terminal may control the virtual skill to switch from the active state to the inactive state, and control the called object to stop executing assistance operation corresponding to the virtual skill.

Further, the terminal may further present the remaining duration in which the virtual skill is in the inactive state; and when the remaining duration reaches a remaining duration threshold or becomes zero, control the virtual skill to switch from the inactive state to an active state, and control the called object to perform, on the lock target again, an assistance operation corresponding to the virtual skill.

Figure 9:
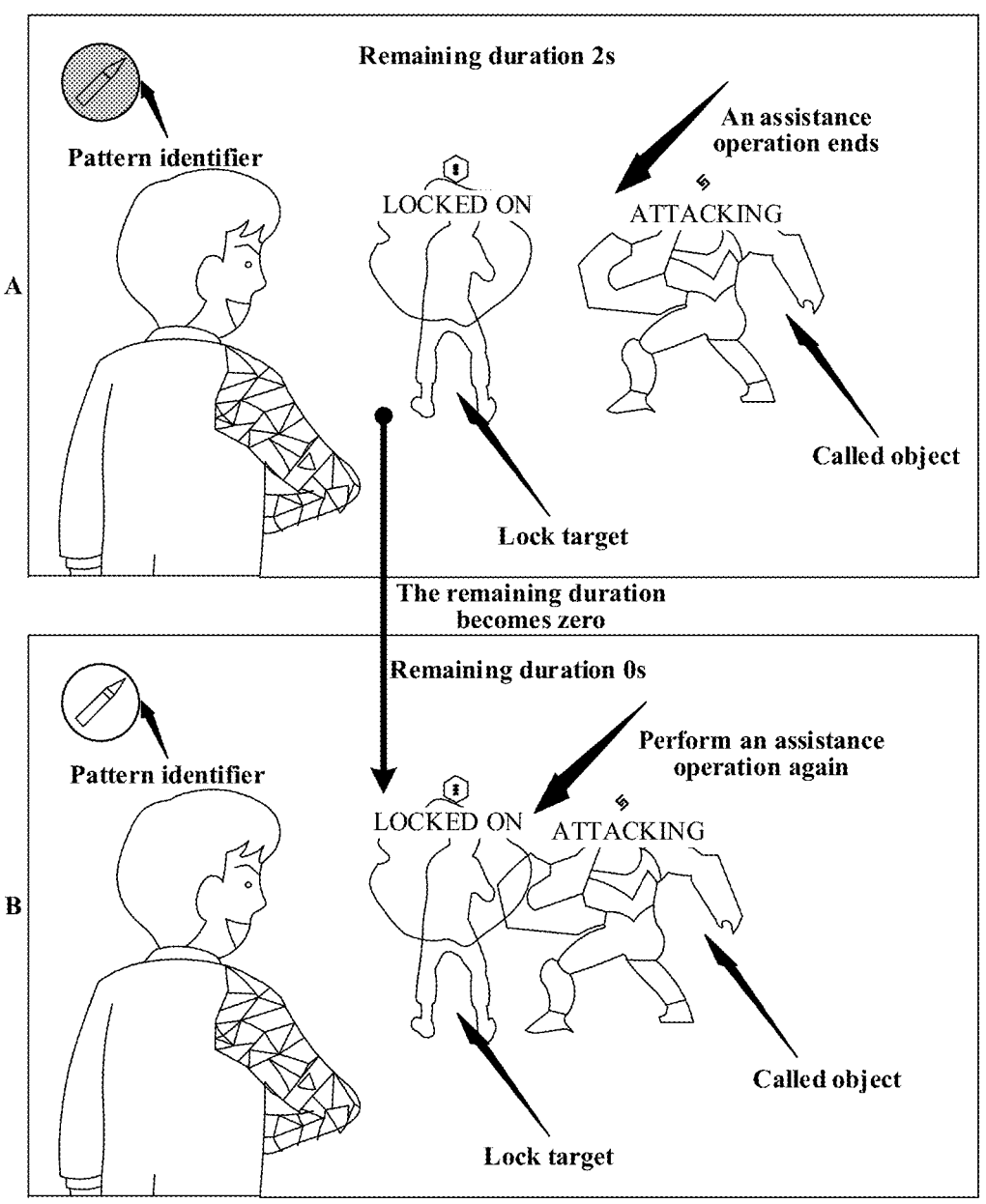
FIG. 9 is a schematic diagram of switching a skill state of a virtual skill according to an embodiment of this disclosure.

In an example, FIG. 9 is a schematic diagram of switching a skill state of a virtual skill according to an embodiment of this disclosure. Herein, after execution of the assistance operation corresponding to the virtual skill is completed, the terminal controls the virtual skill to switch from the active state to the inactive state, for example, switches a pattern identifier corresponding to the virtual skill from an original state (corresponding to the active state) to a gray display state (corresponding to the inactive state), and presents remaining duration 2 s in which the virtual skill is in the inactive state, as shown in a diagram A in FIG. 9; and when the remaining duration becomes zero, controls the virtual skill to switch from the inactive state to the active state, that is, switches the pattern identifier corresponding to the virtual skill from the gray display state (corresponding to the inactive state) to the original state (corresponding to the inactive state), and controls the called object to perform, on the lock target again, an assistance operation, such as an attack assistance operation, that corresponds to the virtual skill, as shown in a diagram B in FIG. 9.

When the lock target is another virtual object in the virtual scene, in some embodiments, after controlling the called object to be in the interactive assistance state corresponding to the lock target, the terminal may present lock prompt information corresponding to the another virtual object, and present state prompt information corresponding to the called object. The lock prompt information is used for indicating that the another virtual object is the lock target, and the state prompt information is used for indicating that the called object is in the interactive assistance state matching the lock target.

Figure 10:
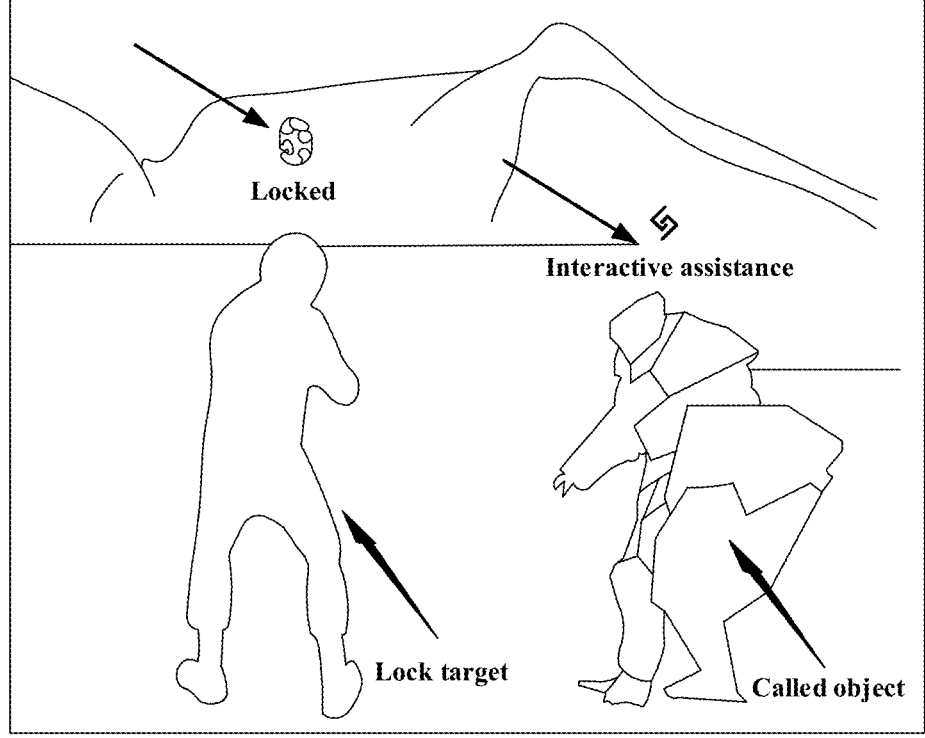
FIG. 10 is a schematic diagram of presentation of lock prompt information and state prompt information according to an embodiment of this disclosure.

In an example, FIG. 10 is a schematic diagram of presentation of lock prompt information and state prompt information according to an embodiment of this disclosure. Herein, the terminal displays lock prompt information "Locked" above the another virtual object, and displays state prompt information "Interactive assistance" above the called object.

In some embodiments, the terminal may present the called object corresponding to the target virtual object in the following manner: presenting a called object that corresponds to the target virtual object and that has a first form. Correspondingly, when the lock target is a scene location in the virtual scene, the terminal may control, in the following manner, the called object to be in the interactive assistance state matching the lock target: controlling the called object to move to a target location corresponding to the lock target in response to the lock command, and controlling a form of the called object to switch from the first form to a second form at the target location, where the second form is used for indicating that the called object is in the interactive assistance state matching the lock target.

Herein, the called object presented by the terminal has the first form, for example, the called object has a character form. When the lock target is a scene location in the virtual scene, for example, the lock target is a point on the ground or a point in the sky in the virtual scene, the called object is controlled to move to the target location corresponding to the lock target in response to the lock command for the lock target. In addition, the form of the called object is controlled to switch from the first form to the second form at the target location, for example, the second form may be a shield wall form or a shield form, so as to control the called object to be in the interactive assistance state matching the lock target.

Figure 11:
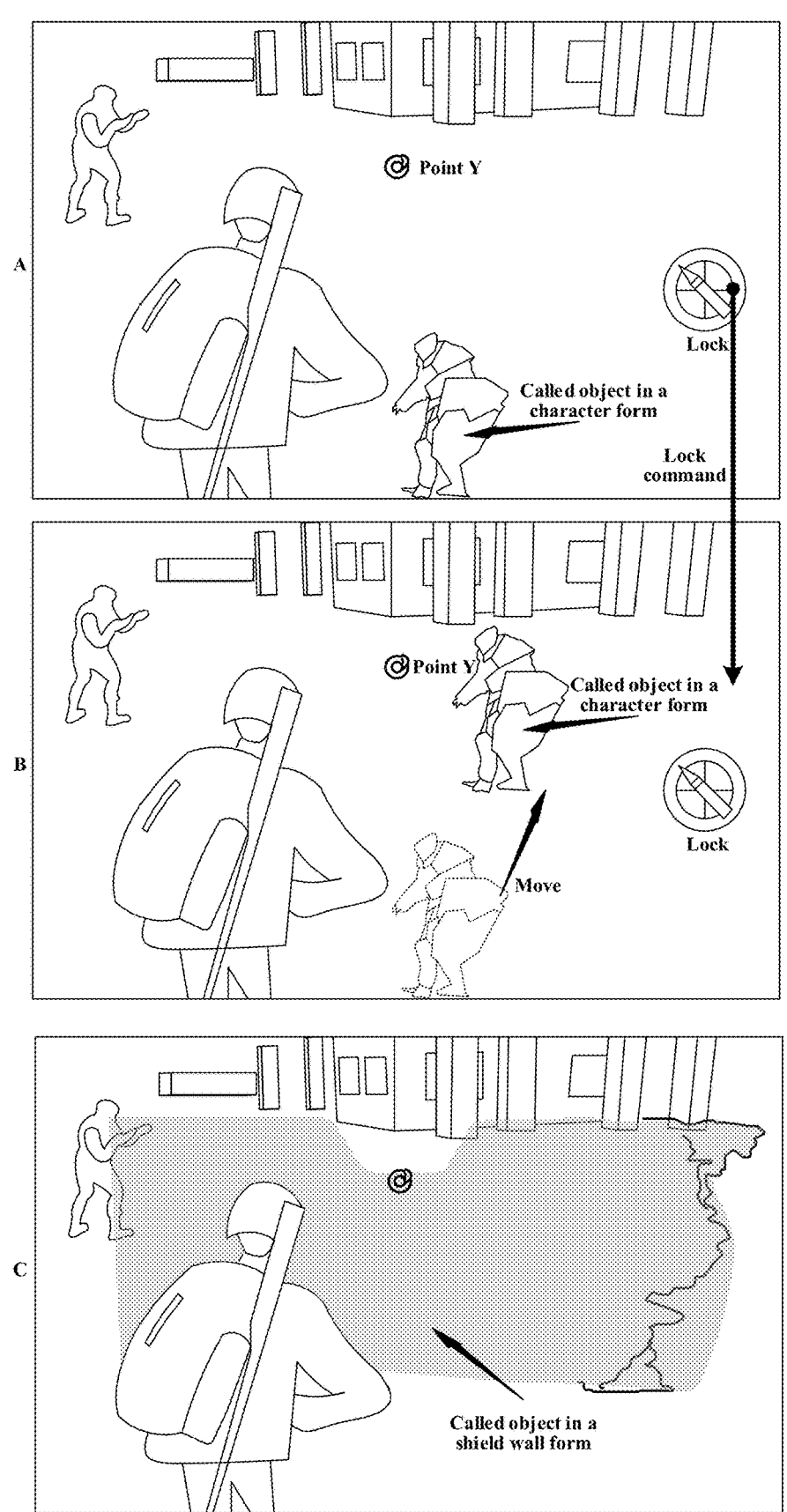
FIG. 11 is a schematic diagram of presentation of an interactive assistance state according to an embodiment of this disclosure.

In an example, FIG. 11 is a schematic diagram of presentation of an interactive assistance state according to an embodiment of this disclosure. Herein, the terminal presents the called object with the first form (namely, the character form), where the called object is still in the following state of moving along with the target virtual object, and is located on the rear right of the target virtual object; further presents a lock target "point Y on the ground" that the target virtual object is controlled to select based on the virtual item, and presents an operation control "Lock" used for triggering the lock command for the lock target, as shown in a diagram A in FIG. 11; and in response to a trigger operation performed on the operation control "Lock", receives the lock command for the lock target, and controls the called object to move to the target location corresponding to the lock target, as shown in a diagram B in FIG. 11; and when the called object arrives at the target location, controls the form of the called object to switch from the first form to the second form, namely, the shield wall form, as shown in a diagram C in FIG. 11.

In some embodiments, the terminal may control, in the following manner, the called object to move to the target location corresponding to the lock target: when a distance between the lock target and the target virtual object does not exceed a target distance, determining a location of the lock target as the target location, and controlling the called object to move to the target location; or when a distance between the lock target and the target virtual object exceeds the target distance, acquiring a vertical height of a lock point corresponding to the lock target from the ground in the virtual scene; and when the vertical height does not exceed a height threshold, determining a location of a vertical projection point of the lock point on the ground as the target location, and controlling the called object to move to the target location.

During practical application, scene space in the virtual scene is infinite, and when the lock target is a scene location in the virtual scene, such as the sky, the ground, or a distant void location, the terminal cannot control the called object to move to a corresponding lock location.

Figure 12:
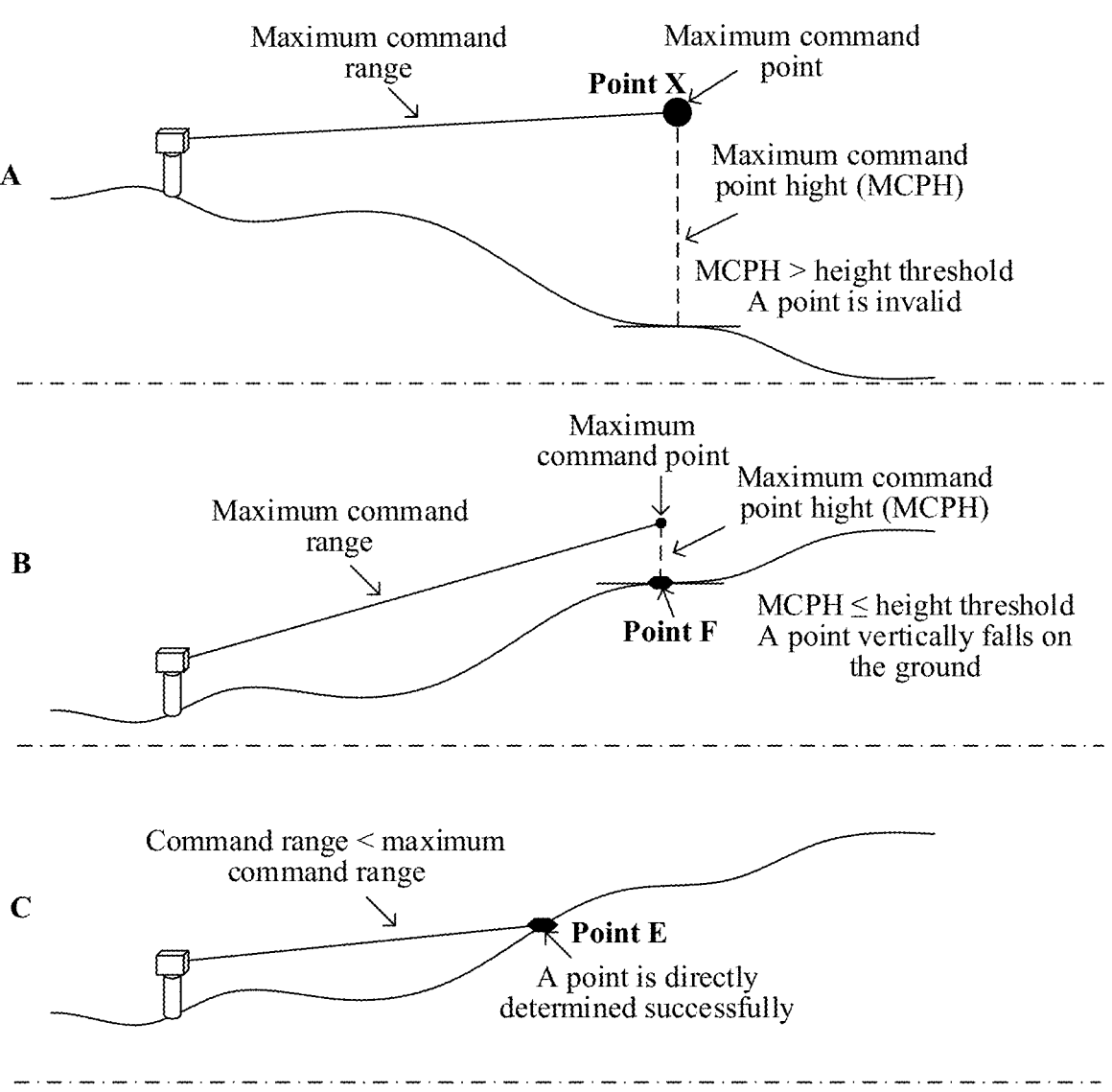
FIG. 12 is a schematic diagram of selecting a target location according to an embodiment of this disclosure.

Therefore, refer to FIG. 12. FIG. 12 is a schematic diagram of selecting a target location according to an embodiment of this disclosure. In this embodiment of this disclosure, a maximum command range corresponding to the lock command, namely, the target distance, may be preset (as shown in FIG. 12). The target distance is a maximum reachable distance of a ray emitted from the target virtual object in a direction indicated by the lock target. A point at the maximum reachable distance corresponding to the ray is denoted as a maximum command point (for example, a maximum command point X shown in FIG. 12), that is, the lock point corresponding to the lock target.

When the called object is controlled to move to the location corresponding to the lock target, the distance between the lock target and the target virtual object (which may be denoted as a command range) is first acquired. When the acquired distance does not exceed the target distance, the location of the lock target is determined as the target location, as shown in a diagram C in FIG. 12 (that is, when the command range is less than the maximum command range, the target location is a point F). In this case, the called object is controlled to move to the target location.

When the acquired distance exceeds the target distance, the vertical height of the lock point corresponding to the lock target from the ground in the virtual scene is acquired, for example, a maximum command point height (MCPH) shown in FIG. 12. When the vertical height does not exceed the height threshold, the location of the vertical projection point of the lock point on the ground is determined as the target location, as shown in a diagram B in FIG. 12 (when the maximum command point height (MCPH) is less than the height threshold, the target location is a point E). In this case, the called object is controlled to move to the target location.

When the vertical height exceeds the height threshold, the determining of the target location is invalid, as shown in a diagram A in FIG. 12 (when the maximum command point height (MCPH) is greater than the height threshold, a point is invalid, that is, the determining of the target location fails). In this case, the called object is not controlled to move.

In some embodiments, the terminal may present an interaction picture in the virtual scene in the following manner: presenting an interaction picture of interaction between the target virtual object and the another virtual object, where the target virtual object and the another virtual object are respectively located on two sides of the called object.

The terminal may control, in the following manner, the called object in the interactive assistance state to perform the corresponding assistance operation on the lock target: when the another virtual object performs an interactive operation on the target virtual object, controlling the called object to block the interactive operation; or when the target virtual object is controlled to project a target virtual item to the another virtual object and the target virtual item passes through the called object, controlling enhancement of an effect of the target virtual item on the another virtual object; or distinctly displaying the another virtual object in a picture in which the target virtual object observes the another virtual object through the called object in the second form.

Herein, during practical application, when the lock target is a scene location in the virtual scene, for example, the lock target is a point on the ground or a point in the sky in the virtual scene, after the terminal controls the called object to be in the interactive assistance state matching the lock target, that is, after the terminal controls the form of the called object to switch from the first form to the second form, the terminal presents an interaction picture in which the target virtual object interacts with the another virtual object. In the interaction picture, the target virtual object and the another virtual object are respectively located on two sides of the called object.

Figure 13:
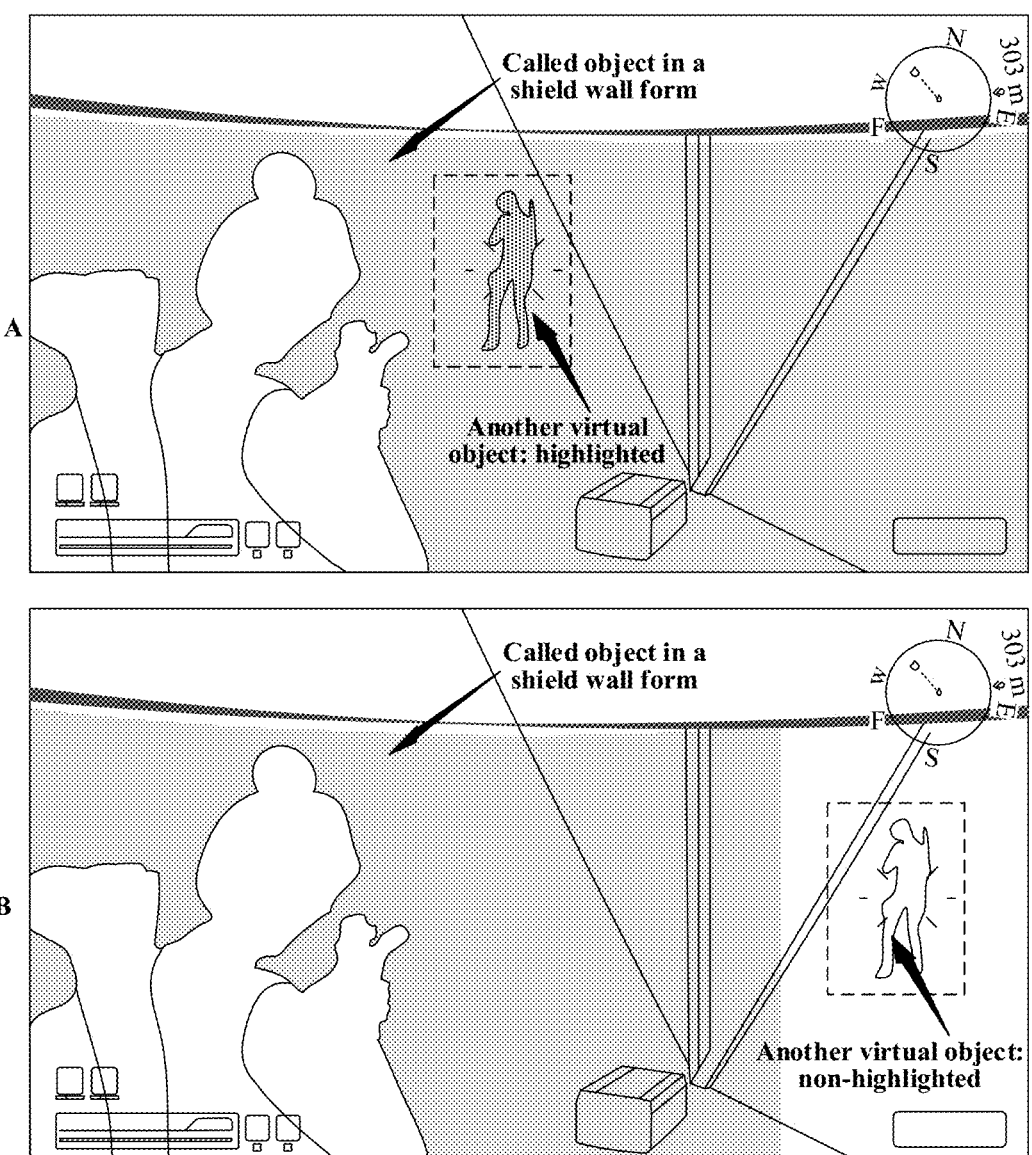
FIG. 13 is a schematic diagram of presentation of a picture of observing another virtual object through a called object in a second form according to an embodiment of this disclosure.

Based on this, when the another virtual object performs an interactive operation on the target virtual object, the terminal may control the called object to block the interactive operation, for example, block an attack operation in front of the called object that is initiated by the another virtual object; or when the terminal controls the target virtual object to project a target virtual item (for example, shoot a virtual bullet or throw a virtual bomb) to the another virtual object and the target virtual item passes through the called object, control enhancement of an effect of the target virtual item on the another virtual object, for example, increase an attack force of the target virtual item; or in a picture in which the target virtual object observes the another virtual object through the called object in the second form, distinctly display the another virtual object, for example, highlight the another virtual object, so that the user can control the target virtual object to quickly determine a location of the another virtual object. In an example, FIG. 13 is a schematic diagram of presentation of a picture of observing another virtual object through a called object in a second form according to an embodiment of this disclosure. Herein, the another virtual object is observed through the called object in the shield wall form, and the another virtual object is highlighted in a picture obtained through observation, as shown in a diagram A in FIG. 13. When the another virtual object moves out of an observation field of view through the called object in the second form, a highlighting effect is lost, as shown in a diagram B in FIG. 13.

In some embodiments, the terminal may control, in the following manner, the called object to be in the interactive assistance state matching the lock target: emitting a detection ray from the virtual item to the lock target in response to the lock command, and performing collision box detection on the lock target based on the detection ray; and when a collision box is detected based on the detection ray, determining the lock target is another virtual object in the virtual scene, and controlling the called object to be in an interactive assistance state matching the another virtual object; or when no collision box is detected based on the detection ray, determining that the lock target is a scene location in the virtual scene, and controlling the called object to be in an interactive assistance state matching the scene location.

Figure 14:
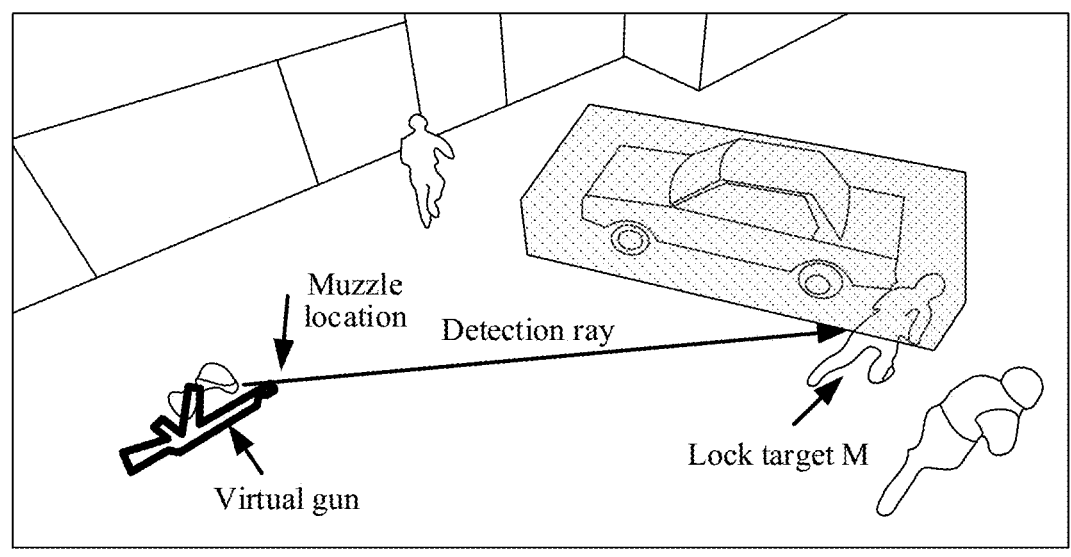
FIG. 14 is a schematic diagram of a detection ray according to an embodiment of this disclosure.

Herein, in response to the lock command for the lock target, the terminal emits the detection ray from the virtual item to the lock target, so as to perform collision box detection on the lock target based on the detection ray. FIG. 14 is a schematic diagram of a detection ray according to an embodiment of this disclosure. Herein, a detection ray is emitted from a location of a muzzle of a virtual gun to a lock target M.

Figure 15:
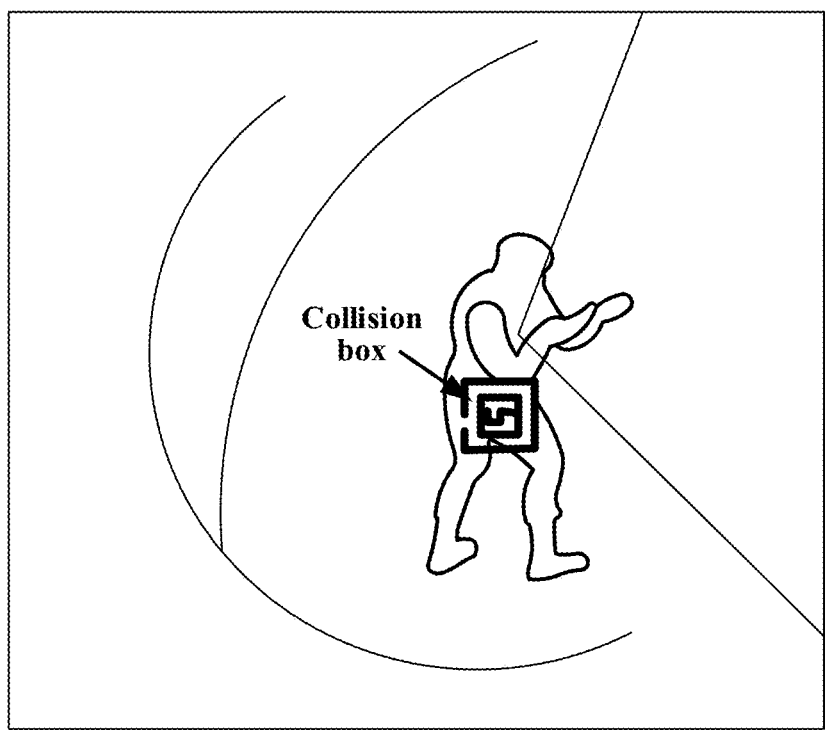
FIG. 15 is a schematic diagram of a collision box according to an embodiment of this disclosure.

During practical application, a collision box for detection by a detection ray is set for each virtual object, as shown in FIG. 15. FIG. 15 is a schematic diagram of a collision box according to an embodiment of this disclosure. Herein, a virtual object N is displayed, and a collision box carried in the virtual object N is also displayed. When a collision box is detected based on the detection ray, it is determined that the lock target is another virtual object in the virtual scene. In this case, the called object is controlled to be in an interactive assistance state, such as an assistance attack state, that matches the another virtual object. When no collision box is detected based on the detection ray, it is determined that the lock target is a scene location in the virtual scene. In this case, the called object is controlled to be in an interactive assistance state matching the scene location. For example, the called object is changed to a shield wall at the scene location, to be in the interactive assistance state.

In some embodiments, the terminal may call the called object in the interactive assistance state in the following manner: receiving a recall command for the called object; and controlling the called object to exit the interactive assistance state in response to the recall command.

Herein, when the user wants to recall the called object, that is, make the called object exit the interactive assistance state, a recall command for the called object may be triggered, and the terminal controls the called object to exit the interactive assistance state in response to the recall command.

In some embodiments, the terminal may receive the recall command for the called object in the following manner: receiving a recall command triggered based on a recall control for the called object; or receiving a recall command for the called object when it is detected that a distance between the called object and the target virtual object exceeds a distance threshold.

During practical application, a recall control used for triggering a recall command may be set, and a recall command for the called object is received when the terminal receives a trigger operation on the recall control; or a threshold of a distance between the called object and the target virtual object may be preset, and a recall command for the called object is received when it is detected that a distance between the called object and the target virtual object exceeds the distance threshold.

In some embodiments, the terminal may control the called object to exit the interactive assistance state in the following manner: acquiring an execution state of controlling the called object to perform the assistance operation; and when the execution state represents that execution of the assistance operation is completed, controlling the called object to exit the interactive assistance state in response to recall command; or when the execution state represents that execution of the assistance operation is not completed, continuing to control the called object to perform the assistance operation, and after the execution is completed, controlling the called object to exit the interactive assistance state in response to recall command.

Herein, when receiving the recall command for the called object, the terminal acquires the execution state of controlling the called object to perform the assistance operation; when the execution state represents that execution of the assistance operation is completed, immediately controls the called object to exit the interactive assistance state in response to recall command; or when the execution state represents that execution of the assistance operation is not completed, continues to control the called object to perform the assistance operation, and after the execution is completed, controls the called object to exit the interactive assistance state in response to the recall command.

By using the foregoing embodiments of this disclosure, a target virtual object holding a virtual item in a virtual scene, and a called object corresponding to the target virtual object are presented; the target virtual object is controlled to use the virtual item to select a lock target in the virtual scene; and when a lock command for the selected lock target is received, the called object is controlled to be in an interactive assistance state matching the lock target, and the called object in the interactive assistance state is controlled to perform a corresponding assistance operation on the lock target, thereby achieving an effect of automatically controlling the called object to assist, by executing the assistance operation, the target virtual object in interacting with another virtual object.

In this way, a plurality of objects (including the target virtual object and the called object) can be controlled to interact with other objects in the virtual scene. In addition, the called object can be controlled to be in the interactive assistance state matching the lock target only by selecting the lock target and triggering the lock command for the lock target, to automatically control the called object to perform the corresponding assistance operation to assist the target virtual object in interacting with another virtual object with simple operations, thereby improving efficiency of human-computer interaction and also improving utilization of hardware processing resources.

The following describes exemplary application of the embodiments of this disclosure in a real application scenario by using an example in which the virtual scene is a video game scene (for example, a shooting game scene).

First, Terms in the Embodiments of this Disclosure are Explained, Including:

(1) Virtual shooting game may include a game that launches a long-range attack by using a virtual item, including but not limited to a first-person shooting game and a third-person shooting game.

(2) Third-person view may include a view in which a camera in a game is located at a specific distance behind a player character, and the character and all battle elements in a specific surrounding environment can be seen in a picture.

(3) Called object may include, in a game, a character (namely, a virtual object) called, by using a virtual chip used for calling a called object, a called object with independent battling abilities, for example, a virtual monster. A player may transmit a lock command for a specific lock target. After receiving the lock command, the called object automatically performs a skill and an interactive behavior corresponding to the lock target, to assist interaction between the player character and the lock target.

In a shooting game in the related art, a player mainly controls a single character for battling, and the player only needs to control movement and attack/shooting timing and directions of a single character, and does not need to control additional operation objects. However, the player may control only a single character for battling, and skills and abilities are limited, causing poor user experience. Therefore, if additional operation objects can be introduced for battling coordination, more possibilities of game experience can be extended. However, no solution is provided for a player to accurately control a plurality of characters to launch centralized attacks to a single lock target in fast-paced real-time battling.

Based on this, the embodiments of this disclosure provide a set of automatically executed logic strategies. A player only needs to transmit a lock command for a lock target to a called object. After receiving the lock command, the called object determines to perform corresponding skills and interactive behaviors, including approaching the lock target in an appropriate manner and releasing a skill after reaching a specific distance from the lock target. In addition, when a location of the lock target changes, the called object automatically corrects its movement direction to try to approach the target before finally releasing a skill.

When the called object can automatically perform the foregoing series of operations, the player can focus on the only character controlled by the player after transmitting one lock command for the lock target, without being distracted by double-line operations. In this way, a plurality of operation objects can be provided for the player, and the player can simply and directly control a plurality of objects in a battle, without mistakes caused by simultaneously controlling two operations objects, thereby enhancing a strategy of cooperation between the player and the called object, and enriching behaviors of the called object. In addition, different interpretations and responses may be given to lock commands initiated by the player in different situations.

In addition, to enrich operation strategies for the player, two lock command branches are designed in the embodiments of this disclosure: a lock command initiated by the player for a scene location, and a lock command initiated by the player for another virtual object (including an enemy player and enemy AI). In both cases, the player may initiate a lock command by using the same button, and the AI uses different behavioral strategies according to different targets.

A method for controlling a called object in a virtual scene in the embodiments of this disclosure mainly includes the following steps: A called object capable of assisting a player in battling is introduced in a virtual scene combat. The player may initiate a lock command for a lock target to the called object by using a button, and a system controls the called object to execute different behavioral strategies according to the lock target corresponding to the lock command initiated by the player. The called object automatically performs battle interaction with the lock target after receiving a lock command for another virtual object (including an enemy player and enemy AI). After the called object receives a lock command pointing to a scene location in the virtual scene, the called object is quickly transmitted to a location of the lock target to become a one-way shield wall, to defend against long-range attacks from the front. In addition, the player can interact with the shield to obtain a variety of buffs. Then the called object is controlled to exit an interactive assistance state corresponding to the lock target, that is, the called object is recalled.

Figures 16, 17:
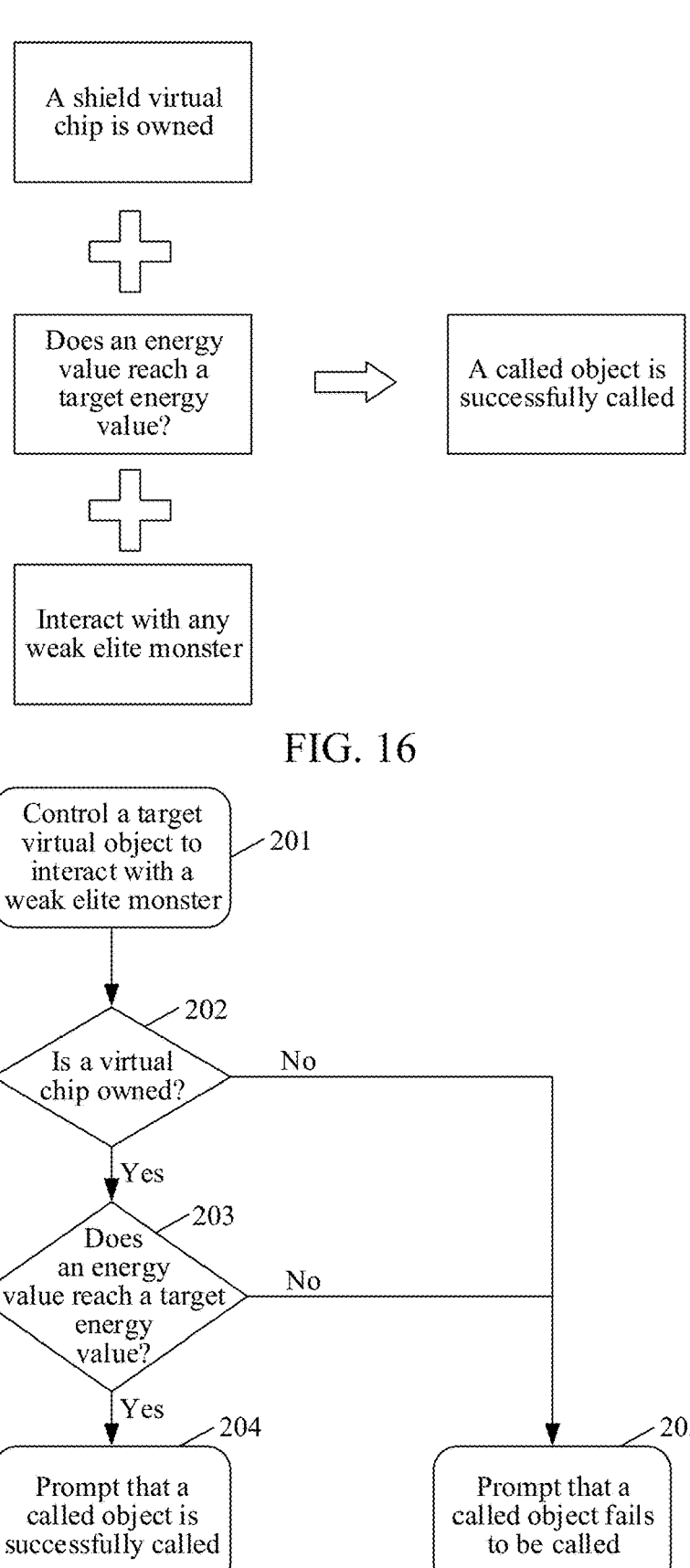
FIG. 16 is a schematic diagram of a calling condition for a called object according to an embodiment of this disclosure.
FIG. 17 is a schematic flowchart of calling a called object according to an embodiment of this disclosure.

First, the following describes the method for controlling a called object in a virtual scene in the embodiments of this disclosure from the perspective of a product. The method may include the following steps:

1. Call a called object: FIG. 16 is a schematic diagram of a calling condition for a called object according to an embodiment of this disclosure. Herein, a player may pick up a shield virtual chip on a battlefield, and may call a called object by interacting with any elite monster in a weak state (for example, a health value is less than a preset threshold) under the condition that nanoenergy of the player is greater than 500 points. During practical application, the called object that is called is in a following state by default, that is, a state of moving along with a target virtual object (namely, a player character).

2. The player triggers a lock command for a scene location in a virtual scene: After the player has the called object, the player may aim a front sight pattern of a held virtual item at any location in the virtual scene, and press a lock button to transmit a lock command to the called object to instruct the called object to enter an interactive assistance state (that is, switch from a character form in the following state to a shield wall form).

As shown in FIG. 11, a lock command for a scene location is received, and the called object is controlled to quickly move to a location of a lock target and expand into a shield wall. As shown in FIG. 12, if a target location of the lock command is beyond a preset maximum range (currently, 60 m), the called object can move only to a boundary location and become a shield wall, where ground coordinates of the location are vertically projected from a location that is 60 meters ahead of a location of the player in a direction toward a front sight location. During practical application, an orientation of the shield wall is the same as an orientation at which the player initiates a command. A default effect of the shield wall is to defend against all long-range attacks from the front of the wall in one direction. In addition, the player can control a target virtual object to interact with the shield wall to obtain different battle buffs. For example, if a bullet shot by the player passes through the shield wall, gains or effects such as an increase in an attack force can be obtained.

As shown in FIG. 13, the player may further obtain a "night vision" effect by using the shield wall. To be specific, when the target virtual object is controlled to observe a virtual object of another player through the shield wall, a virtual object of another player across the wall is highlighted. However, when the highlighted object moves out of an area of the shield wall in the player's field of view, the highlighting effect is lost.

When the player needs to recall the called object, the player may call the called object in the shield wall state back to the player side by using a recall command, and the called is restored to a default form.

3. The player triggers a lock command for another virtual object: As shown in FIG. 6, after the player has the called object, the player may aim a front sight pattern of a held virtual item at another virtual object in the virtual scene, and press a lock button to transmit a lock command to the called object.

As shown in FIG. 10, if another virtual object is locked, a locked state prompt is displayed above the another virtual object, and a corresponding state prompt is also displayed above the called object in a locked state.

The called object that receives the lock command for the lock target automatically sets the lock target as the only attack object, and ignores other targets. As shown in FIG. 7, the called object quickly moves toward a location of a lock target, for example, may bypass an obstacle through running by using a pathfinding algorithm. When the called object moves to a preset range corresponding to the lock target, the called object slows down and enters an attack preparation action. In the stage of the attack preparation action, the called object performs direction correction with movement of the lock target, to ensure that an orientation always faces the lock target. After the attack preparation action ends, a shield monster attacks the lock target by rapidly hitting against the lock target by using a held virtual item (for example, raising a shield). During this stage, a shield of the virtual item expands, and a weakness of the lock target is exposed if the lock target is hit. In addition, if the lock target is a virtual object of a real player, virtual armor assembled to the virtual object of the real player is smashed, and an armor value cannot be restored for a period of time.

After the attack action ends, the called object enters an attack skill cooling state. The called object in the cooling state moves around the lock target or performs other possible interactive behaviors. When an attack skill cooling time ends, the called object performs an attack behavior again.

4. Exit logic of the interactive assistance state: When the called object in the interactive assistance state receives a recall command from the player, the called object immediately returns to a state of following the player. If the called object is executing an attack skill when the player initiates a recall command, the called object returns to the state of following the player after execution of the current attack skill is completed. When the called object in the interactive assistance state is beyond a range (for example, 75 meters) from the player, the current interactive assistance state is forcibly interrupted, so that the called object is restored to the following state of following movement of the player.

Figure 18:
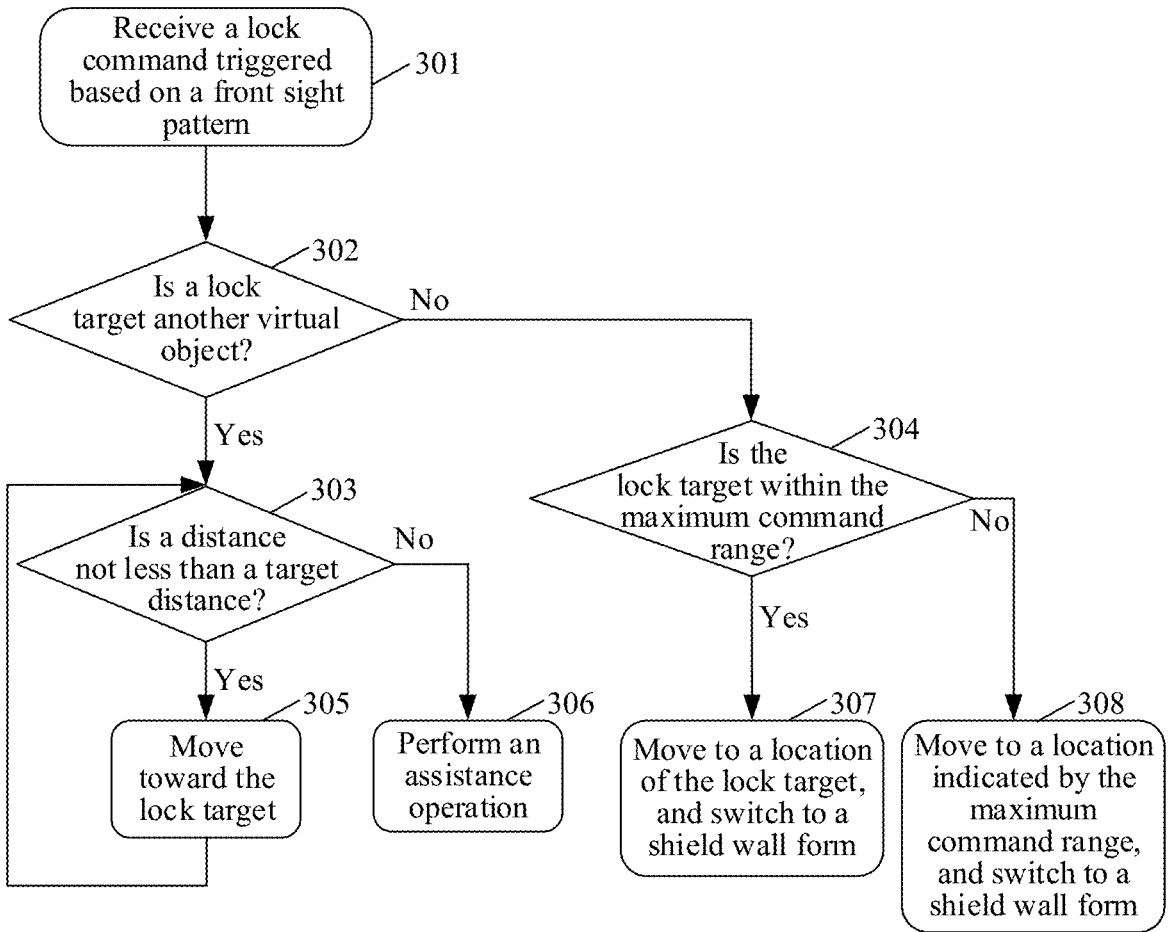
FIG. 18 is a schematic flowchart of a method for controlling a called object in a virtual scene according to an embodiment of this disclosure.

Further, the following describes the method for controlling a called object in a virtual scene in the embodiments of this disclosure from the perspective of a technology. Refer to FIG. 17 and FIG. 18.

FIG. 17 is a schematic flowchart of calling a called object according to an embodiment of this disclosure. The process includes the following steps:

In step 201, control a target virtual object to interact with a weak elite monster.

In step 202, determine whether the target virtual object has a virtual chip. If yes, step 203 is performed. If no, step 205 is performed.

In step 203, determine whether an energy value of the target virtual object reaches a target energy value. If yes, step 204 is performed. If no, step 205 is performed.

In step 204, prompt that a called object is successfully called.

In step 205, prompt that a called object fails to be called.

FIG. 18 is a schematic flowchart of a method for controlling a called object in a virtual scene according to an embodiment of this disclosure. The method includes the following steps:

In step 301, receive a lock command that is triggered for a lock target based on a front sight pattern.

In step 302, determine whether the lock target corresponding to the lock command is another virtual object. If yes, step 303 is performed. If no, step 304 is performed.

In step 303, determine whether a distance between the lock target and a target virtual object is not less than a target distance. If yes, step 305 is performed. If no, step 306 is performed.

In step 304, determine whether a location indicated by the lock target is within a maximum command range. If yes, step 307 is performed. If no, step 308 is performed.

In step 305, control a called object to move toward the lock target, and perform step 303.

In step 306, control the called object to perform a corresponding assistance operation on the lock target.

In step 307, control the called object to move to the location of the lock target, and change a form from a character form to a shield wall form.

In step 308, control the called object to move to a location indicated by a maximum command range, and change a form from a character form to a shield wall form.

During practical application, when a player initiates a lock command by using a unique button, a system detects whether a target collision box exists in a ray path aimed at by a front sight. If a collision box is detected, an owner of the collision box (another player, an NPC, or calling AI) is attacked as a lock target. If no collision box is detected, location coordinates at which a front sight pattern aims are acquired. If a distance between the coordinate location and the player exceeds a preset maximum range value, the called object moves to a projection point of the ray at the preset maximum range value, and becomes a shield wall. If the location coordinates at which the front sight aims are within the preset maximum range value, the called object moves to the coordinate location at which the front sight pattern aims, and becomes a shield wall.

During practical application, when a player presses a command button, a detection ray is emitted from a muzzle of a virtual item to a front sight, as shown in FIG. 14. Each target in a virtual scene has a collision box for detection by a ray, as shown in FIG. 15. When the ray detects the collision box, the object is used as a lock target. In this case, the front sight becomes red, and a lock target command is initiated when the command button is pressed. If the ray cannot detect a collision box of a target object, it is considered that a current location at which the front sight aims is a common scene location. When the command button is pressed, a scene command is initiated, and the called object moves to corresponding location coordinates, and becomes a shield wall.

By using the foregoing embodiments of this disclosure, a plurality of operation objects can be provided for the player, and the player can simply and directly control a plurality of objects in a battle, without mistakes caused by simultaneously controlling two operations objects, thereby enhancing a strategy of cooperation between the player and the called object, and enriching behaviors of the called object. In addition, different interpretations and responses may be given to lock commands initiated by the player in different situations.

It may be understood that related data such as user information is involved in the embodiments of this disclosure. When the embodiments of this disclosure are applied to a specific product or technology, user permission or consent is required, and collection, use, and processing of related data need to comply with related laws, regulations, and standards in related countries and regions.

The following further describes an example structure of the apparatus 555 for controlling a called object in a virtual scene in the embodiments of this disclosure when the apparatus is implemented as software modules. In some embodiments, as shown in FIG. 2, software modules of the apparatus 555 for controlling a called object in a virtual scene that is stored in the memory 550 may include: a presentation module 5551, configured to present a target virtual object holding a virtual item in a virtual scene, and a called object corresponding to the target virtual object; a first control module 5552, configured to control the target virtual object to use the virtual item to select a lock target in the virtual scene; a receiving module 5553, configured to receive a lock command for the selected lock target; and a second control module 5554, configured to control the called object to be in an interactive assistance state matching the lock target in response to the lock command, and control the called object in the interactive assistance state to perform a corresponding assistance operation on the lock target, where the called object in the interactive assistance state is used for assisting, through the assistance operation, the target virtual object in interacting with another virtual object. One or more modules, submodules, and/or units of the apparatus can be implemented by processing circuitry, software, or a combination thereof, for example.

In some embodiments, the apparatus further includes: a calling module, configured to: when a virtual chip used for calling the called object exists in the virtual scene, control the target virtual object to pick up the virtual chip; acquire an attribute value of the target virtual object; and call, based on the virtual chip, the called object corresponding to the target virtual object when it is determined, based on the attribute value, that a calling condition corresponding to the called object is met.

In some embodiments, the first control module 5552 is further configured to: present a front sight pattern corresponding to the virtual item; control the target virtual object to use the virtual item to perform an aiming operation on the lock target; and control the front sight pattern to synchronously move toward the lock target during execution of the aiming operation, and select the lock target in the virtual scene when the front sight pattern moves to the lock target.

In some embodiments, the receiving module 5553 is further configured to: present an operation control used for locking the lock target; and receive the lock command for the selected lock target in response to a trigger operation performed on the operation control.

In some embodiments, the presentation module 5551 is further configured to present a called object in a following state of moving along with the target virtual object; and the second control module 5554 is further configured to control the called object to switch from the following state to the interactive assistance state matching the lock target in response to the lock command.

In some embodiments, when the lock target is another virtual object in the virtual scene, the second control module 5554 is further configured to: acquire a distance between the called object and the lock target; and when the distance is less than a target distance, control the called object in the interactive assistance state to perform the corresponding assistance operation on the lock target; or when the distance is not less than the target distance, control the called object to move toward a first target area corresponding to the lock target, and when the called object moves to the first target area, control the called object in the interactive assistance state to perform the corresponding assistance operation on the lock target.

In some embodiments, the second control module 5554 is further configured to: control the called object to move toward a second target area including the first target area, and control the called object to be in an interactive preparation state when the called object moves to the second target area, where the called object holds a virtual assistance item; and control the called object in the interactive preparation state to move from the second target area toward the first target area, and during movement from the second target area toward the first target area, when the lock target moves, control an orientation of the virtual assistance item to be directly facing the lock target by adjusting an orientation of the called object in the interactive preparation state with respect to the lock target.

In some embodiments, when the lock target is another virtual object in the virtual scene, the second control module 5554 is further configured to: acquire a skill state of a virtual skill corresponding to the called object; and when the skill state represents that the virtual skill is in an active state, control the called object in the interactive assistance state to perform, on the lock target, an assistance operation corresponding to the virtual skill.

In some embodiments, the second control module 5554 is further configured to: after execution of the assistance operation corresponding to the virtual skill is completed, control the virtual skill to switch from the active state to an inactive state, and present remaining duration in which the virtual skill is in the inactive state; and when the remaining duration reaches a remaining duration threshold or becomes zero, control the virtual skill to switch from the inactive state to an active state, and control the called object to perform, on the lock target again, an assistance operation corresponding to the virtual skill.

In some embodiments, when the lock target is another virtual object in the virtual scene, the presentation module 5551 is further configured to present lock prompt information corresponding to the another virtual object, and present state prompt information corresponding to the called object, where the lock prompt information is used for indicating that the another virtual object is the lock target, and the state prompt information is used for indicating that the called object is in the interactive assistance state matching the lock target.

In some embodiments, the presentation module 5551 is further configured to present a called object that corresponds to the target virtual object and that has a first form; and when the lock target is a scene location in the virtual scene, the second control module 5554 is further configured to control the called object to move to a target location corresponding to the lock target in response to the lock command, and control a form of the called object to switch from the first form to a second form at the target location, where the second form is used for indicating that the called object is in the interactive assistance state matching the lock target.

In some embodiments, the second control module 5554 is further configured to: when a distance between the lock target and the target virtual object does not exceed a target distance, determine a location of the lock target as the target location, and control the called object to move to the target location; or when a distance between the lock target and the target virtual object exceeds the target distance, acquire a vertical height of a lock point corresponding to the lock target from the ground in the virtual scene; and when the vertical height does not exceed a height threshold, determine a location of a vertical projection point of the lock point on the ground as the target location, and control the called object to move to the target location.

In some embodiments, the presentation module 5551 is further configured to present an interaction picture of interaction between the target virtual object and the another virtual object, where the target virtual object and the another virtual object are respectively located on two sides of the called object; and the second control module 5554 is further configured to: when the another virtual object performs an interactive operation on the target virtual object, control the called object to block the interactive operation; or when the target virtual object is controlled to project a target virtual item to the another virtual object and the target virtual item passes through the called object, control enhancement of an effect of the virtual item on the another virtual object.

In some embodiments, the second control module 5554 is further configured to: emit a detection ray from the virtual item to the lock target in response to the lock command, and perform collision box detection on the lock target based on the detection ray; and when a collision box is detected based on the detection ray, determine that the lock target is another virtual object in the virtual scene, and control the called object to be in an interactive assistance state matching the another virtual object; or when no collision box is detected based on the detection ray, determine that the lock target is a scene location in the virtual scene, and control the called object to be in an interactive assistance state matching the scene location.

In some embodiments, the apparatus further includes: a recall module, configured to: receive a recall command for the called object; and control the called object to exit the interactive assistance state in response to the recall command.

In some embodiments, the recall module is further configured to: receive a recall command triggered based on a recall control for the called object; or receive a recall command for the called object when it is detected that a distance between the called object and the target virtual object exceeds a distance threshold.

In some embodiments, the recall module is further configured to: acquire an execution state of controlling the called object to perform the assistance operation; and when the execution state represents that execution of the assistance operation is completed, control the called object to exit the interactive assistance state in response to the recall command; or when the execution state represents that execution of the assistance operation is not completed, continue to control the called object to perform the assistance operation, and after the execution is completed, control the called object to exit the interactive assistance state in response to the recall command.

By using the foregoing embodiments of this disclosure, a target virtual object holding a virtual item in a virtual scene, and a called object corresponding to the target virtual object are presented; the target virtual object is controlled to use the virtual item to select a lock target in the virtual scene; and when a lock command for the selected lock target is received, the called object is controlled to be in an interactive assistance state matching the lock target, and the called object in the interactive assistance state is controlled to perform a corresponding assistance operation on the lock target, thereby achieving an effect of automatically controlling the called object to assist, by executing the assistance operation, the target virtual object in interacting with another virtual object.

In this way, a plurality of objects (including the target virtual object and the called object) can be controlled to interact with other objects in the virtual scene. In addition, the called object can be controlled to be in the interactive assistance state matching the lock target only by selecting the lock target and triggering the lock command for the lock target, to automatically control the called object to perform the corresponding assistance operation to assist the target virtual object in interacting with another virtual object with simple operations, thereby improving efficiency of human-computer interaction and also improving utilization of hardware processing resources.

An embodiment of this disclosure further provides an electronic device. The electronic device includes a memory and a processor. The memory is configured to store computer-executable instructions. The processor is configured to implement the method for controlling a called object in a virtual scene in the embodiments of this disclosure during execution of the computer-executable instructions stored in the memory.

An embodiment of this disclosure further provides a computer program product or a computer program, where the computer program product or the computer program may include computer-executable instructions, and the computer-executable instructions are stored in a computer-readable storage medium. A processor of a computer device reads the computer-executable instructions from the computer-readable storage medium, and the processor executes the computer-executable instructions, so that the computer device performs the method for controlling a called object in a virtual scene in the embodiments of this disclosure.

An embodiment of this disclosure further provides a computer-readable storage medium, such as a non-transitory computer-readable storage medium, storing computer-executable instructions. When being executed by a processor, the computer-executable instructions implement the method for controlling a called object in a virtual scene in the embodiments of this disclosure.

In some embodiments, the computer-readable storage medium may be a memory such as an FRAM, a ROM, a PROM, an EPROM, an EEPROM, a flash memory, a magnetic memory, a compact disc, or a CD-ROM; or may be various devices including one of or any combination of the foregoing memories.

In some embodiments, the computer-executable instructions may be written in the form of a program, software, a software module, a script, or code according to a programming language in any form (including a compiled or interpretive language, or a declarative or procedural language), and may be deployed in any form, including being deployed as a standalone program, or being deployed as a module, a component, a subroutine, or another unit suitable for use in a computing environment.

In an example, the computer-executable instructions may, but not necessarily, correspond to a file in a file system, and may be stored as a part of a file that stores other programs or data, for example, stored in one or more scripts of a Hypertext Markup Language (HTML) document, stored in a single file dedicated to the discussed program, or stored in a plurality of co-files (for example, files that store one or more modules, subroutines, or code parts).

In an example, the computer-executable instructions may be deployed on one computing device for execution, or may be executed on a plurality of computing devices in one location, or may be executed on a plurality of computing devices that are distributed in a plurality of locations and that are interconnected through a communication network.

The foregoing descriptions are merely exemplary embodiments of this disclosure and are not intended to limit the scope of this disclosure. Other embodiments are within the scope of this disclosure.

What is claimed is:

1. A method for controlling an auxiliary virtual object in a virtual scene, the method comprising:
controlling a first virtual object to select a lock target in the virtual scene for the auxiliary virtual object;
receiving a lock command for the selected lock target;
displaying the auxiliary virtual object in a first form;

based on the lock target being a second virtual object in the virtual scene,
controlling the auxiliary virtual object to enter a first assist state based on the lock command, the auxiliary virtual object being configured to automatically perform at least one action on the second virtual object in the first assist state; and
based on the lock target being a scene location in the virtual scene,
controlling the auxiliary virtual object to move to a target location corresponding to the lock target based on the lock command, and
controlling the auxiliary virtual object to enter a second assist state and to switch from being displayed in the first form to being displayed in a second form of the second assist state at the target location.

2. The method according to claim 1, further comprising:
controlling the first virtual object to pick up a virtual item;
acquiring an attribute value of the first virtual object; and
calling, via the virtual item, the auxiliary virtual object based on the attribute value of the first virtual object satisfying a calling condition of the auxiliary virtual object.

3. The method according to claim 1, wherein the controlling the first virtual object to select the lock target comprises:
displaying a front sight pattern;
controlling the first virtual object to perform an aiming operation on the lock target with the front sight pattern; and
selecting the second virtual object in the virtual scene as the lock target based on the front sight pattern pointing at the lock target.

4. The method according to claim 1, wherein the receiving the lock command comprises:
displaying a lock control function to lock onto the selected lock target; and
receiving the lock command in response to selection of the lock control function.

5. The method according to claim 1, further comprising:
displaying the auxiliary virtual object in a following state in which the auxiliary virtual object moves along with the first virtual object; and
based on the lock target being the second virtual object, the controlling the auxiliary virtual object includes controlling the auxiliary virtual object to switch from the following state to the first assist state in which the at least one action is automatically performed in response to the lock command.

6. The method according to claim 1, wherein, based on the lock target being the second virtual object, the controlling the auxiliary virtual object comprises:
acquiring a distance between the auxiliary virtual object and the lock target;
based on the distance being less than a target distance, controlling the auxiliary virtual object to perform the at least one action on the lock target; and
based on the distance not being less than the target distance, controlling the auxiliary virtual object to move to a first target area corresponding to the lock target and perform the at least one action on the lock target in the first target area.

7. The method according to claim 6, wherein the controlling the auxiliary virtual object to move to the first target area comprises:
controlling the auxiliary virtual object to move to a second target area that includes the first target area, and controlling the auxiliary virtual object to be in an interactive preparation state when the auxiliary virtual object moves to the second target area, the auxiliary virtual object holding a virtual assistance item; and controlling the auxiliary virtual object in the interactive preparation state to move from the second target area toward the first target area, and during movement from the second target area toward the first target area, controlling an orientation of the virtual assistance item to face the lock target by adjusting an orientation of the auxiliary virtual object in the interactive preparation state with respect to the lock target.

8. The method according to claim 1, wherein, based on the lock target being the second virtual object, the controlling the auxiliary virtual object comprises:

acquiring a skill state of a virtual skill of the auxiliary virtual object; and based on the skill state being an active state, controlling the auxiliary virtual object to perform, on the lock target, the at least one action corresponding to the virtual skill.

9. The method according to claim 8, further comprising:

after execution of the at least one action corresponding to the virtual skill is completed, controlling the virtual skill to switch from the active state to an inactive state, and displaying a remaining duration in which the virtual skill is in the inactive state; and when the remaining duration reaches a remaining duration threshold, controlling the virtual skill to switch from the inactive state to the active state, and controlling the auxiliary virtual object to perform, on the lock target, the at least one action corresponding to the virtual skill.

10. The method according to claim 1, wherein, based on the lock target being the second virtual object in the virtual scene, the method further comprises:

displaying lock prompt information indicating that the second virtual object is the lock target; and displaying state prompt information indicating that the auxiliary virtual object is in the first assist state.

11. The method according to claim 1, wherein, based on the lock target being the scene location, the controlling the auxiliary virtual object to move to the target location comprises:

when a distance between the lock target and the first virtual object exceeds a target distance, acquiring a vertical height of a lock point corresponding to the lock target from a ground in the virtual scene; and when the vertical height does not exceed a height threshold, determining a location of a vertical projection point of the lock point on the ground as the target location, and controlling the auxiliary virtual object to move to the target location.

12. The method according to claim 1, wherein the auxiliary virtual object in the second assist state is configured to reduce an effect of an action performed by the second virtual object from a first side of the auxiliary virtual object, or enhance an effect of an action performed by the first virtual object from a second side of the auxiliary virtual object.

13. The method according to claim 12, wherein the second virtual object is highlighted when viewed through the auxiliary virtual object in the second assist state.

14. The method according to claim 1, further comprising: receiving a recall command for the auxiliary virtual object; and controlling the auxiliary virtual object to exit the first assist state in response to the recall command.

15. The method according to claim 14, wherein the receiving the recall command comprises:

receiving the recall command based on one of a recall control for the auxiliary virtual object and a distance between the auxiliary virtual object and the first virtual object exceeding a distance threshold.

16. The method according to claim 14, wherein the controlling the auxiliary virtual object to exit the first assist state comprises:

based on the at least one action being completed, controlling the auxiliary virtual object to exit the first assist state in response to the recall command; and based on the at least one action not being completed, controlling the auxiliary virtual object to exit the first assist state in response to the recall command after execution of the at least one action is completed.

17. An apparatus, comprising:

processing circuitry configured to:

control a first virtual object to select a lock target in a virtual scene for an auxiliary virtual object;

receive a lock command for the selected lock target;

display the auxiliary virtual object in a first form;

based on the lock target being a second virtual object in the virtual scene, control the auxiliary virtual object to enter a first assist state based on the lock command, the auxiliary virtual object being configured to automatically perform at least one action on the second virtual object in the first assist state; and based on the lock target being a scene location in the virtual scene, control the auxiliary virtual object to move to a target location corresponding to the lock target based on the lock command, and control the auxiliary virtual object to enter a second assist state and to switch from being displayed in the first form to being displayed in a second form of the second assist state at the target location.

18. The apparatus according to claim 17, wherein the auxiliary virtual object in the second assist state is configured to:

reduce an effect of an action performed by the second virtual object from a first side of the auxiliary virtual object, or enhance an effect of an action performed by the first virtual object from a second side of the auxiliary virtual object.

19. A non-transitory computer-readable storage medium storing instructions which when executed by a processor cause the processor to perform:

controlling a first virtual object to select a lock target in a virtual scene for an auxiliary virtual object;

receiving a lock command for the selected lock target;

displaying the auxiliary virtual object in a first form;

based on the lock target being a second virtual object in the virtual scene, controlling the auxiliary virtual object to enter a first assist state based on the lock command, the auxiliary virtual object being configured to automatically perform at least one action on the second virtual object in the first assist state; and based on the lock target being a scene location in the virtual scene, controlling the auxiliary virtual object to move to a target location corresponding to the lock target based on the lock command, and controlling the auxiliary virtual object to enter a second assist state and to switch from being displayed in the first form to being displayed in a second form of the second assist state at the target location.

20. The non-transitory computer-readable storage medium according to claim 19, wherein the auxiliary virtual object in the second assist state is configured to:

reduce an effect of an action performed by the second virtual object from a first side of the auxiliary virtual object, or enhance an effect of an action performed by the first virtual object from a second side of the auxiliary virtual object.

* * * * *